United States Patent
Jiang et al.

(10) Patent No.: US 11,224,065 B2
(45) Date of Patent: Jan. 11, 2022

(54) METHODS AND DEVICES FOR TRANSMITTING AND RECEIVING DATA, COMMUNICATION APPARATUS AND SYSTEM, AND STORAGE MEDIUM

(71) Applicant: ZTE Corporation, Guangdong (CN)

(72) Inventors: Chuangxin Jiang, Guangdong (CN); Zhaohua Lu, Guangdong (CN); Hao Wu, Guangdong (CN); Bo Gao, Guangdong (CN); YuNgok Li, Guangdong (CN); Shujuan Zhang, Guangdong (CN); Huahua Xiao, Guangdong (CN); Wenjun Yan, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/214,287

(22) Filed: Mar. 26, 2021

(65) Prior Publication Data
US 2021/0219327 A1    Jul. 15, 2021

Related U.S. Application Data

(63) Continuation of application No. PCT/CN2019/108198, filed on Sep. 26, 2019.

(30) Foreign Application Priority Data

Sep. 27, 2018 (CN) .......................... 201811134358.8

(51) Int. Cl.
*H04W 4/00* (2018.01)
*H04W 72/12* (2009.01)
(Continued)

(52) U.S. Cl.
CPC ....... *H04W 72/1289* (2013.01); *H04L 5/0048* (2013.01); *H04L 1/0003* (2013.01); *H04L 1/0006* (2013.01)

(58) Field of Classification Search
CPC ............. H04W 72/1289; H04L 5/0048; H04L 1/0003; H04L 1/0006
(Continued)

(56) References Cited

U.S. PATENT DOCUMENTS

| 8,989,756 B2 * | 3/2015 | Shan ................... H04W 72/042 455/450 |
| 2014/0169297 A1 | 6/2014 | Kim et al. |

(Continued)

FOREIGN PATENT DOCUMENTS

| CN | 101989901 A | 3/2011 |
| CN | 102137504 A | 7/2011 |

(Continued)

OTHER PUBLICATIONS

International Search Report and Written Opinion received for Application No. PCT/CN2019/108198 dated Dec. 31, 2019, (8 pages).

(Continued)

*Primary Examiner* — Maharishi V Khirodhar
(74) *Attorney, Agent, or Firm* — Crowell & Moring LLP

(57) ABSTRACT

A transmitting and receiving point (TRP) divides data scheduled by one downlink control information (DCI) into N data parts, and transmits the N data parts to a receiving side, where N≥1. A value of N and whether the N data parts have a correlation in a case of N>1 are determined by at least one of following scheduling information: a transmission configuration indicator (TCI) field, a demodulation reference signal (DMRS) port indicator, a modulation and coding scheme (MCS), a redundancy version (RV) or a new data indicator (NDI). After receiving the N data parts sent by the TRP, the receiving side determines whether the N data parts have the correlation according to at least one of the TCI, the DMRS port indicator, the MCS, the RV, or the NDI.

24 Claims, 7 Drawing Sheets

(51) Int. Cl.
  *H04L 5/00* (2006.01)
  *H04L 1/00* (2006.01)
(58) Field of Classification Search
  USPC .......................................................... 370/329
  See application file for complete search history.

(56) References Cited

U.S. PATENT DOCUMENTS

| | | | |
|---|---|---|---|
| 2019/0230656 A1* | 7/2019 | Soriaga | ............... H04W 72/042 |
| 2020/0015200 A1* | 1/2020 | Vilaipornsawai | ... H04W 72/042 |
| 2020/0100277 A1* | 3/2020 | Khoshnevisan | .. H04W 72/1289 |

FOREIGN PATENT DOCUMENTS

| | | |
|---|---|---|
| CN | 107820318 A | 3/2018 |
| CN | 108111272 A | 6/2018 |
| WO | WO 2020/007293 A1 | 1/2020 |

OTHER PUBLICATIONS

Huawei et al., "Discussion on Multi-TRP/panel Transmission for Reliability and Robustness in NR," *3GPP TSG RAN WG1 Meeting #94*, Aug. 20-24, 2018, article entitled "Sidelink Synchronization Mechanisms for NR V2X ", obtained from https://www.3gpp.org/DynaReport/TDocExMtg--R1-94--18796.htm (4 pp).
Formality Examination Result for Vietnam Application No. 10937w/SHTT-SC dated May 31, 2021, (3 pages).
Extended European Search Report for Application No. EP 19865834.6 dated Oct. 21, 2021 (8 pages).
NTT Docomo, Inc., "Enhancements on Multi-TRP/panel transmission," 3GPP Draft; R1-1811348, 3$^{rd}$Generation Partnership Project (3GPP), Mobile Competence Centre; 650, Route Des Lucioles; F-06921 Sophia-Antipolis Cedex; France, Sep. 12, 2018 (Sep. 12, 2018), pp. 1-21, XP051518751, Retrieved from the Internet:.

* cited by examiner

US 11,224,065 B2

METHODS AND DEVICES FOR TRANSMITTING AND RECEIVING DATA, COMMUNICATION APPARATUS AND SYSTEM, AND STORAGE MEDIUM

RELATED APPLICATION

This application is a continuation application of PCT Patent Application No. PCT/CN2019/108198 filed Sep. 26, 2019 entitled "METHODS AND DEVICES FOR TRANSMITTING AND RECEIVING DATA, COMMUNICATION APPARATUS AND SYSTEM, AND STORAGE MEDIUM," which claims priority to Chinese patent application No. 201811134358.8 filed on Sep. 27, 2018. The entireties of the above applications are incorporated herein by reference.

TECHNICAL FIELD

The present disclosure relates to, but is not limited to, the field of communications.

BACKGROUND

In new radio (NR) Release-15, due to limited time, joint transmission of multiple transmitting and receiving points (TRPs) has not been discussed sufficiently. The current NR version does not support a solution of performing data transmission on a same user by multiple TRPs. For an ultra-high reliability ultra-low latency communication (uRLLC) service, in order to ensure the transmission reliability, whether the multiple TRPs can be applied for joint transmission has not been discussed.

SUMMARY

An embodiment of the present disclosure provides a data sending method, and the method includes steps described below. Data scheduled by one downlink control information (DCI) is divided into N data parts, where N≥1, and a value of N and whether the N data parts have a correlation in a case of N>1 are determined by at least one of following scheduling information: a transmission configuration indicator (TCI) field, a demodulation reference signal (DMRS) port indicator, a modulation and coding scheme (MCS), a redundancy version (RV) or a new data indicator (NDI); the N data parts are transmitted to a receiving side.

An embodiment of the present disclosure further provides a data receiving method, and the method includes a step described below. N data parts sent by a TRP are received, where the N data parts are scheduled by one downlink control information (DCI), N≥1, and a value of N and whether the N data parts have a correlation in a case of N>1 are determined by at least one of following scheduling information: a TCI field, a DMRS port indicator, a MCS, a RV or a NDI.

An embodiment of the present disclosure further provides a data sending apparatus, and the data sending apparatus includes a data dividing module and a data sending module. The data dividing module is configured to divide data scheduled by DCI into N data parts, where N≥1, and a value of N and whether the N data parts have a correlation in a case of N>1 are determined by at least one of the following scheduling information: a TCI field, a DMRS port indicator, a MCS, a RV or a NDI; the data sending module is configured to transmit the N data parts to a receiving side.

An embodiment of the present disclosure further provides a data receiving apparatus, and the data receiving apparatus includes a data receiving module. The data receiving module is configured to receive N data parts sent by a TRP, where the N data parts are data scheduled by DCI, N≥1, and a value of N and whether the N data parts have a correlation in a case of N>1 are determined by at least one of the following scheduling information: a TCI field, a DMRS port indicator, a MCS, a RV or a NDI.

An embodiment of the present disclosure further provides a communication device, which includes a processor, a memory, and a communication bus. The communication bus is configured to implement connection communication between the processor and the memory. The processor is configured to execute a data sending program stored in the memory to implement the steps of the data sending method.

An embodiment of the present disclosure further provides a communication device, which includes a processor, a memory, and a communication bus. The communication bus is configured to implement connection communication between the processor and the memory. The processor is configured to execute a data receiving program stored in the memory to implement the steps of the data receiving method.

An embodiment of the present disclosure further provides a communication system, which includes a terminal and at least one TRP. The terminal is the above-mentioned communication device in which the processor can execute the data receiving program to implement steps of the data receiving method described above; the TRP is the above-mentioned communication device in which the processor can execute the data sending program to implement the steps of the data sending method described above.

An embodiment of the present disclosure further provides a storage medium, which stores at least one of a data sending program or a data receiving program. The data sending program can be executed by at least one processor to implement the steps of the data sending method described above. The data receiving program can be executed by at least one processor to implement the steps of the data receiving method described above.

DETAILED DESCRIPTION

The present disclosure will be described in detail in connection with the embodiments and the accompanying drawings, from which the purpose, technical solutions and advantages of the present disclosure will be more apparent. It should be understood that specific embodiments described herein are intended to explain the present disclosure, and not to limit the present disclosure.

Embodiment 1

Figure 1:
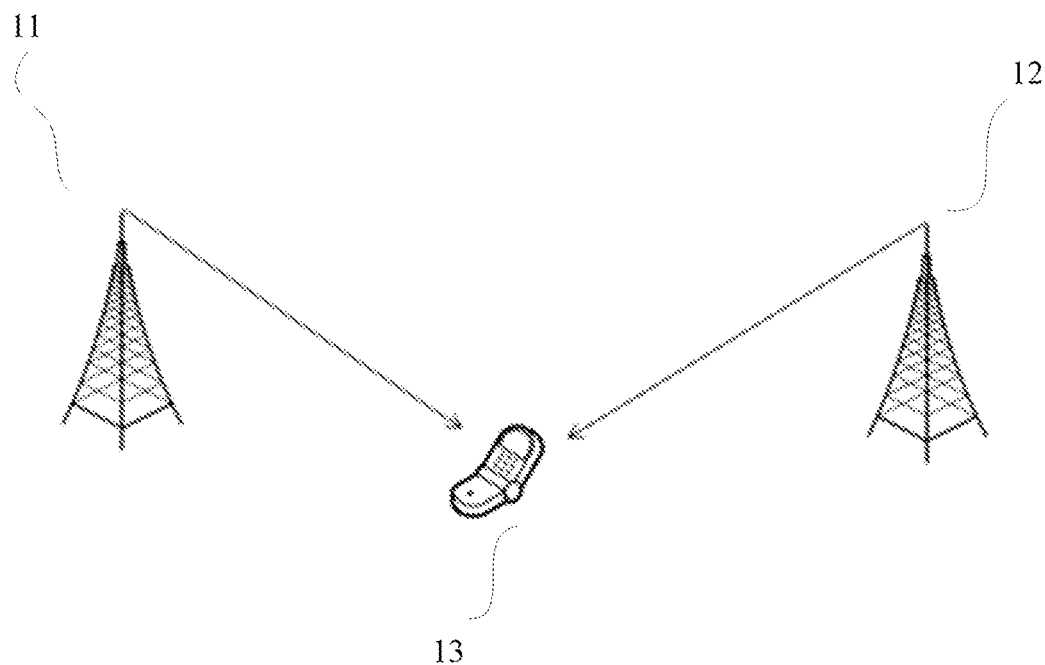
FIG. 1 is a schematic diagram of multi-point transmission according to an embodiment of the present disclosure.

The design of NR Release-15 (R15) did not consider the multi-TRP transmission solution, that is, multiple TRPs transmit data to a same user. As shown in FIG. 1, a first TRP 11 and a second TRP 12 both transmit data to a same user 13. Of course, the two TRPs may transmit data to the user 13 in a same time unit, or may transmit data to the user 13 in different time units.

Assuming that a serving cell of the user is the first TRP 11, in a case where an ideal backhaul exists between the first TRP 11 and the second TRP 12, the first TRP 11 can send a physical downlink control channel (PDCCH) to schedule multiple data streams, that is, multiple transmission layers. When actually sending the data streams, multiple transmission layers can be sent by the first TRP 11 and the second TRP 12 respectively. For example, the DCI format 1_1 sent by the first TRP 11 schedules four data transmission layers, which correspond to four DMRS ports. Two of the four data transmission layers can come from the first TRP 11 and the other two layers can come from the second TRP 12. In this case, the R15 solution does not require major changes to support the transmission of multiple TRPs, because two cooperative TRPs can interact dynamically, and the transmission of the control channel can be completed by the serving cell.

However, for the uRLLC service with the higher transmission reliability requirement, if the first TRP 11 and the second TRP 12 can transmit the same or related data, the probability that the UE receives the data correctly will greatly increase, thereby increasing transmission reliability and reducing transmission delay. However, even for the uRLLC service, the multi-TRP transmission cannot be performed at every moment, and multiple TRPs are not required to transmit the same or related data at every moment. For example, in a case where the channel quality is high, the first TRP 11 and the second TRP 12 can transmit different data streams or data blocks to increase the transmission capacity; while in a case where the channel quality is low, the first TRP 11 and the second TRP 12 can transmit the same or related data to increase reliability. A more flexible solution is to support dynamically switching between the multi-TRP transmission and the single TRP transmission, and support dynamically switching between a state in which the data sent by the multi-TRP transmission are repeated and a state in which the data sent by the multi-TRP transmission are not repeated during the multi-TRP transmission.

Figure 2:
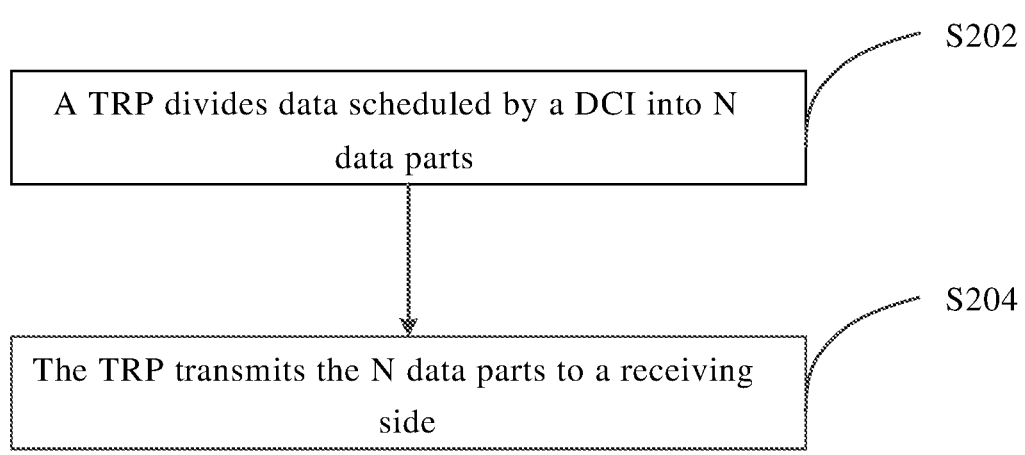
FIG. 2 is a flowchart of a data sending method according to an embodiment of the present disclosure.

In order to ensure switching between the multi-TRP transmission and the single TRP transmission, and switching between the state in which the data sent by the multi-TRP transmission are repeated and the state in which the data sent by the multi-TRP transmission are not repeated during the multi-TRP transmission, an embodiment of the present disclosure provides a data sending method, as shown in FIG. 2.

Referring to FIG. 2, the data sending method according to the embodiment of the present disclosure may include steps S202 to S204.

In step S202, the TRP divides data scheduled by one DCI into N data parts.

Optionally, each data part of the N data parts corresponds to at least one of: one DMRS port group; one transport block (TB); one transmission layer group including at least one transmission layer; or one physical downlink shared channel (PDSCH).

In some examples of this embodiment, a value of N is determined by at least one of scheduling information: a TCI field, a DMRS port indicator, a MCS, a RV or a NDI.

In some other examples of this embodiment, whether the N data parts have a correlation can be determined by at least one of scheduling information: a TCI field, a DMRS port indicator, a MCS, a RV or a NDI. The "correlation" is that one data part is repeated with another data part or that one data part is correlated with another data part. The term "correlated" herein means that useful information which can be used for combining between two data parts is the same, and the receiving side can perform combining demodulation after acquiring the two data parts.

In some examples of this embodiment, a value of N and whether the N data parts have a correlation each can be determined by at least one of following scheduling information: a TCI field, a DMRS port indicator, a MCS, a RV or a NDI.

In this embodiment, the value of N may be greater than or equal to 1. It should be understood that when N is equal to 1, multiple data parts do not exist, and therefore, it is not required to indicate the correlation between the data parts through one or more of the scheduling information described above. When N is greater than 1, it is required to indicate the correlation between the respective data parts to the receiving side through at least one of the scheduling information described above.

In some examples of this embodiment, the value of N may be equal to R, where R refers to a number of TCIs corresponding to a TCI field, or a number of quasi-co-located reference signal (QCL RS) sets in the TCIs corresponding to the TCI field.

In an exemplary embodiment, when R is greater than 1 (that is, the number of TCIs corresponding to the TCI field is more than 1, or the number of QCL RS sets in the TCI(s) corresponding to the TCI field is more than 1), whether the N data parts have the correlation is notified to the receiving side through the DMRS port indicator.

In general, a mapping relationship of a DMRS port indicator corresponding to a case where R is greater than 1 is different from a mapping relationship of a DMRS port indicator corresponding to a case where R is equal to 1. Assuming that the mapping relationship of the DMRS port indicator corresponding to the case where R is equal to 1 is referred to as a "first mapping relationship", and the mapping relationship of the DMRS port indicator corresponding to the case where R is greater than 1 is referred to as a "second mapping relationship", the first mapping relationship is different from the second mapping relationship. The "mapping relationship" may refer to a DMRS port indicator table. A DMRS port indicator table corresponding to the first mapping relationship may be an existing DMRS port indicator table in the related art, and a DMRS port indicator table corresponding to the second mapping relationship is a new DMRS port indicator table.

In some examples of this embodiment, if the DMRS port indicator characterizes that the N data parts have the correlation, the N data parts correspond to N TBs, that is, the N data parts correspond to the N TBs respectively. Optionally, a predefined relationship is satisfied between RVs of the N TBs. For example, assuming that the value of N is 2, that is, there are two TBs and RVs of the two TBs may satisfy the predefined relationship. For example, in the predefined relationship, when the RV of TB1 is 0, the RV of TB2 is 2 accordingly; when the RV of TB1 is 2, the RV of TB2 is 3 accordingly.

It should be understood that, when the RVs of N TBs satisfy the predefined relationship, RV fields in the DCI may be reduced, for example, generally, when the value of N is 2, two RV fields need to be included in the DCI, and are respectively used for indicating the RVs of two TBs. If the RVs of the two TBs satisfy the predefined relationship, only one RV field may be set in the DCI, the value carried by the RV field may indicate the RV of one of the TBs, and the RV of the other TB may be determined according to the value carried by the RV field and the predefined relationship.

In the above example, whether the N data parts have the correlation is notified to the receiving side through the DMRS port indicator. In other examples of this embodiment, the TRP may further notify the receiving side whether the N data parts have the correlation by using a relationship between NDIs corresponding to the N data parts.

For example, assuming that a higher layer configures N NDI fields in the DCI, a relationship between the N NDI fields may be used for indicating whether the corresponding N TBs have a repetition relationship. That the value of N is 2 is taken as an example. The TRP may indicate to the receiving side whether TB1 and TB2 are repeated by whether values in the two NDI fields are the same. For example, a value of a NDI corresponding to code word 1 (CW1) is 1, and if a value of a NDI corresponding to CW2 is 0, the values in the two NDI fields are different, that is, NDI toggling occurs. At this time, data on CW2 is independent of data on CW1, that is, TB1 and TB2 are not repeated. If the NDI value corresponding to CW1 is 1 and the NDI value corresponding to CW2 is also 1, then no NDI toggling occurs. At this time, the data on CW2 and the data on CW1 are repeated, that is, TB1 and TB2 are repeated.

In the foregoing examples, the value of N is equal to R, that is, the value of N is equal to the number of QCL RS sets in the TCIs corresponding to the TCI field. In other examples of this embodiment, the value of N may be smaller than the number of all QCL RS sets in all TCIs corresponding to the TCI field.

In some examples of this embodiment, if the N data parts have the correlation, at least one of the following corresponding to the N data parts is the same: a number of DMRS ports, the MCS, or the NDI. For example, in an exemplary embodiment, if the N data parts have the correlation, the number of DMRS ports, the MCS, and the NDI which correspond to the N data parts each are same. For another example, in another exemplary embodiment, if the N data parts have the correlation, the number of DMRS ports and the NDI which correspond to the N data parts are same, but the MCS may be different.

In S204, the TRP transmits the N data parts to the receiving side.

After dividing data scheduled by one DCI into N data parts, the TRP may transmit the N data parts to the receiving side.

In some occasions, the TRP may configure a number T2 of transmissions of data through a higher layer, and T2 represents a number of transmissions required for the data. When the value of T2 is greater than 1, the TRP uses different time-domain resources to send the data. In this embodiment, the TRP may divide the data into N data parts before sending the data, and the N data parts may have a correlation, in this case, sending one time is equivalent to repeatedly sending the data N times. Therefore, when the number of transmissions of the data configured by the higher layer is T2 and the N data parts have a correlation, the number T1 of actual transmissions may not need to reach T2. In an exemplary embodiment, the value of T1 may be T2/N.

It should be understood that, according to the foregoing introduction, the N data parts may be sent to the receiving side through different base stations. Therefore, the receiving side can receive data parts from different TRPs, and then demodulate the data according to the correlation determined based on the foregoing scheduling information. If the N data parts have the correlation, the receiving side can combine and demodulate the data; otherwise, the receiving side can independently demodulate the data parts.

After the receiving side demodulates the received N data parts, a data receiving state of the receiving side can be fed back to the TRP according to a demodulation result. It should be understood that if the N data parts have the correlation, the receiving side can perform joint feedback for the N data parts. For example, only one response message A/N (that is, ACK/NACK) is fed back for the N data parts. If the N data parts do not have the correlation, the receiving side can perform independent feedback for the data parts. For TRP, if the N data parts sent to the receiving side have the correlation, only one A/N is received for one data transmission; if the N data parts sent by the TRP to the receiving side do not have the correlation, the TRP can receive multiple A/Ns. For example, in some cases, the TRP can receive N A/Ns.

According to the data sending method provided in this embodiment, when the TRP sends downlink data to the terminal, the data scheduled by one DCI can be divided into N data parts and the N data parts can be sent to the terminal through one or more of scheduling information such as the TCI field, DMRS port indicator, MCS, RV, or NDI to indicate the value of N and the correlation between the N data parts to the terminal, so that the data transmission between the TRP and the terminal is more flexible, and dynamic switching between repeated transmission and non-repeated transmission can be implemented, thereby improving the flexibility of data transmission.

Embodiment 2

Figure 3:
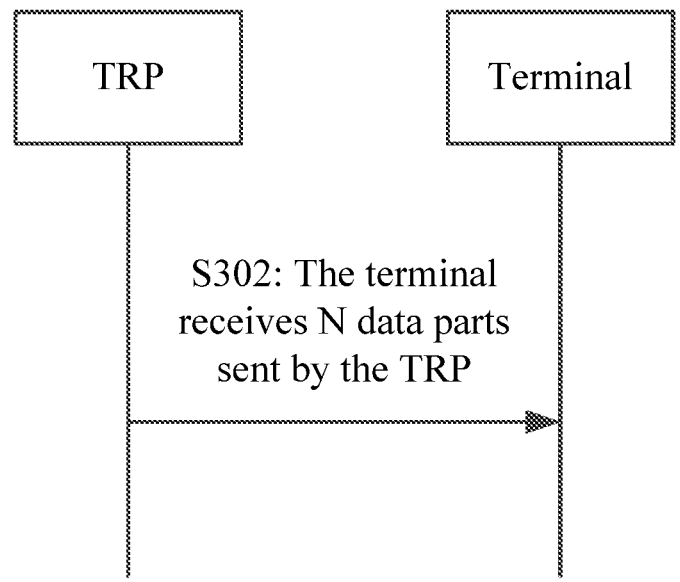
FIG. 3 is a flowchart of a data receiving method according to an embodiment of the present disclosure.

An embodiment of the present disclosure further provides a data receiving method applied to a terminal, as shown in FIG. 3.

Referring to FIG. 3, the data receiving method according to the embodiment of the present disclosure includes a step S302.

In step S302, the terminal receives N data parts sent by a TRP.

Optionally, each data part of the N data parts corresponds to at least one of: one DMRS port group; one TB; one transmission layer group, where the transmission layer group includes at least one transmission layer; or one PDSCH.

In some examples of this embodiment, a value of N is determined by at least one of following scheduling information: a TCI field, a DMRS port indicator, a MCS, a RV or a NDI.

In some other examples of this embodiment, whether the N data parts have a correlation can be determined by at least one of following scheduling information: a TCI field, a DMRS port indicator, a MCS, a RV or a NDI. The "correlation" is that one data part is repeated with another data part or that one data part is correlated with another data part. The term "correlated" herein means that useful information which can be used for combining between two data parts is the same, and the terminal can perform combination and demodulation after acquiring the two data parts.

In some examples of this embodiment, the value of N and whether the N data parts have a correlation each can be determined by at least one of following scheduling information: the TCI field, DMRS port indicator, MCS, RV or NDI.

In this embodiment, the value of N may be greater than or equal to 1, and it should be understood that when N is equal to 1, multiple data parts do not exist; at this time, the terminal only receives one data part, and therefore, the terminal does not need to determine the correlation through one or more of the scheduling information described above. When N is greater than 1, the terminal can receive multiple data parts, at this time, whether the data parts have the correlation will affect demodulation processing of the data parts on the terminal, and therefore, the terminal needs to determine the correlation between the data parts according to at least one of the scheduling information described above.

In some examples of this embodiment, the value of N may be equal to R, where R refers to a number of TCIs corresponding to a TCI field, or a number of QCL RS sets in the TCIs corresponding to the TCI field.

In an exemplary embodiment, when R is greater than 1 (that is, the number of TCIs corresponding to the TCI field is more than 1, or the number of QCL RS sets in the TCIs corresponding to the TCI field is more than 1), the terminal can determine whether the N data parts have the correlation according to the DMRS port indicator.

In general, a mapping relationship of a DMRS port indicator corresponding to a case where R is greater than 1 is different from a mapping relationship of a DMRS port indicator corresponding to a case where R is equal to 1. Assuming that the mapping relationship of the DMRS port indicator corresponding to the case where R is equal to 1 is referred to as a "first mapping relationship", and the mapping relationship of the DMRS port indicator corresponding to the case where R is greater than 1 is referred to as a "second mapping relationship", the first mapping relationship is different from the second mapping relationship. The "mapping relationship" may refer to a DMRS port indicator table. A DMRS port indicator table corresponding to the first mapping relationship may be an existing DMRS port indicator table in the related art, and a DMRS port indicator table corresponding to the second mapping relationship is a new DMRS port indicator table.

In some examples of this embodiment, if the DMRS port indicator characterizes that the N data parts have the correlation, the N data parts correspond to N TBs, that is, the N data parts correspond to the N TBs one to one. Optionally, a predefined relationship is satisfied between RVs of the N TBs. For example, assuming that the value of N is 2, that is, there are two TBs and RVs of the two TBs may satisfy the predefined relationship. For example, in the predefined relationship, when the RV of TB1 is 0, the RV of TB2 is 2 accordingly; when the RV of TB1 is 2, the RV of TB2 is 3 accordingly.

It should be understood that, when the RVs of N TBs satisfy the predefined relationship, RV fields in the DCI may be reduced, for example, generally, when the value of N is 2, two RV fields need to be included in the DCI, and are respectively used for indicating the RVs of two TBs. If the RVs of the two TBs satisfy the predefined relationship, only one RV field may be set in the DCI, the terminal can determine the RV of one of the TBs according to the value carried by the RV field, and determine the RV of the other TB according to the value carried by the RV field and the predefined relationship.

In the above example, the terminal determines whether the N data parts have the correlation through the DMRS port indicator. In other examples of this embodiment, the terminal may further determine whether the N data parts have the correlation according to a relationship between NDIs corresponding to the N data parts.

For example, assuming that a higher layer configures N NDI fields in the DCI, the terminal can determine whether the corresponding N TBs have a repetition relationship by using a relationship between the N NDI fields. That the value of N is 2 is taken as an example. The terminal can determine whether TB1 and TB2 are repeated by whether values in the two NDI fields are the same. For example, a value of a NDI corresponding to CW1 is 1, and if a value of a NDI corresponding to CW2 is 0, the values in the two NDI fields are different, that is, NDI toggling occurs; at this time, data on CW2 is independent of data on CW1, that is, TB1 and TB2 are not repeated. If the NDI value corresponding to CW1 is 1 and the NDI value corresponding to CW2 is also 1, then no NDI toggling occurs. At this time, the data on CW2 and the data on CW1 are repeated, that is, TB1 and TB2 are repeated.

In the foregoing example, the value of N is equal to R, that is, the value of N is equal to the number of QCL RS sets in the TCIs corresponding to the TCI field. In other examples of this embodiment, the value of N may be smaller than the number of all QCL RS sets in all TCIs corresponding to the TCI field.

In some examples of this embodiment, if the N data parts have the correlation, at least one of the following corresponding to the N data parts is the same: a number of DMRS ports, the MCS, or the NDI. For example, in an exemplary embodiment, if the N data parts have the correlation, the number of DMRS ports, the MCS, and the NDI which correspond to the N data parts each are same. For another example, in another exemplary embodiment, if the N data parts have the correlation, the number of DMRS ports and the NDI which correspond to the N data parts are same, but the MCS may be different.

In some occasions, the TRP can configure the number T2 of receptions of the terminal for the data is configured by a higher layer. Therefore, T2 also characterizes a number of transmissions of the TRP for the data. When the value of T2 is greater than 1, it means that TRP will use different time-domain resources to send the data. Therefore, the terminal correspondingly needs to receive data at different time-domain resources. In this embodiment, the TRP may divide the data into N data parts before sending the data, and the N data parts may have a correlation, in this case, sending one time is equivalent to repeatedly sending the data N times. Therefore, when a number of receptions of data configured by the higher layer is T2 and the N data parts have the correlation, a number T1 of actual receptions of the terminal may not need to reach T2. In an exemplary embodiment, the value of T1 can be T2/N.

It should be understood that, according to the foregoing introduction, the N data parts may be sent to the terminal through different base stations. Therefore, the terminal can receive data parts from different TRPs, and then demodulate the data according to the correlation based on the foregoing scheduling information. If the N data parts have the correlation, the terminal can combine and demodulate the data; otherwise, the terminal can independently demodulate the data parts.

After the terminal demodulates the received N data parts, a data receiving state of the terminal can be fed back to the TRP according to a demodulation result. It should be understood that if the N data parts have the correlation, the terminal can perform joint feedback for the N data parts. For example, only one response message A/N (that is, ACK/NACK) is fed back for the N data parts. If the N data parts do not have the correlation, the terminal can perform independent feedback for the data parts.

According to the data receiving method provided in this embodiment, when TRP sends downlink data to the terminal, data scheduled by one DCI can be divided into N data parts and the N data parts can be sent to the terminal. When the terminal receives and demodulates, the value of N and whether the N data parts have the correlation can be determined by at least one of the scheduling information such as the TCI field, DMRS port indicator, MCS, RV, or NDI. By this manner, dynamic switching between repeated transmission and non-repeated transmission can be implemented in the data transmission between the TRP and the terminal, thereby improving the flexibility of data transmission.

Embodiment 3

In order to enable those skilled in the art to be more aware of the advantages and details of the data sending method and the data receiving method described above, the data transmission solution will continue to be introduced.

In order to make a data transmission more flexible, TB information scheduled by the DCI may depend on the indication of the TCI and the indication of the DMRS port. The TB information refers to a number of TBs and whether multiple TBs are the same or related.

When the base station uses the TCI field in the DCI indicates multiple TCIs, or multiple QCL RS sets, the multiple TCIs or the multiple QCL RS sets correspond to a transmission of multiple TRPs, that is, a multi-TRP transmission; when the TCI state indicated by the base station by using the TCI field in the DCI to correspond to one TCI, or the corresponding TCI includes only one QCL RS set, the one TCI or the one QCL RS set corresponds to a transmission of a TRP, that is, a single TRP transmission.

In the multi-TRP transmission, because different TRPs generally transmit different transmission layers, that is, a number of transmission layers is greater than 1, and DMRS ports corresponding to multiple TRPs are usually not placed in a same code division multiplexing (CDM) group, which is quite different from the single TRP transmission. Therefore, the single TRP transmission and the multi-TRP transmission need to correspond to different DMRS port indicator tables. The DMRS port indicator table corresponding to the single TRP transmission can use the existing table, and the DMRS port indicator table corresponding to multi-TRP transmission needs to be redesigned. Since the TCI is notified by the DCI, the DMRS port indicator tables corresponding to the single TRP transmission and multi-TRP transmission can be dynamically selected.

Figure 4:
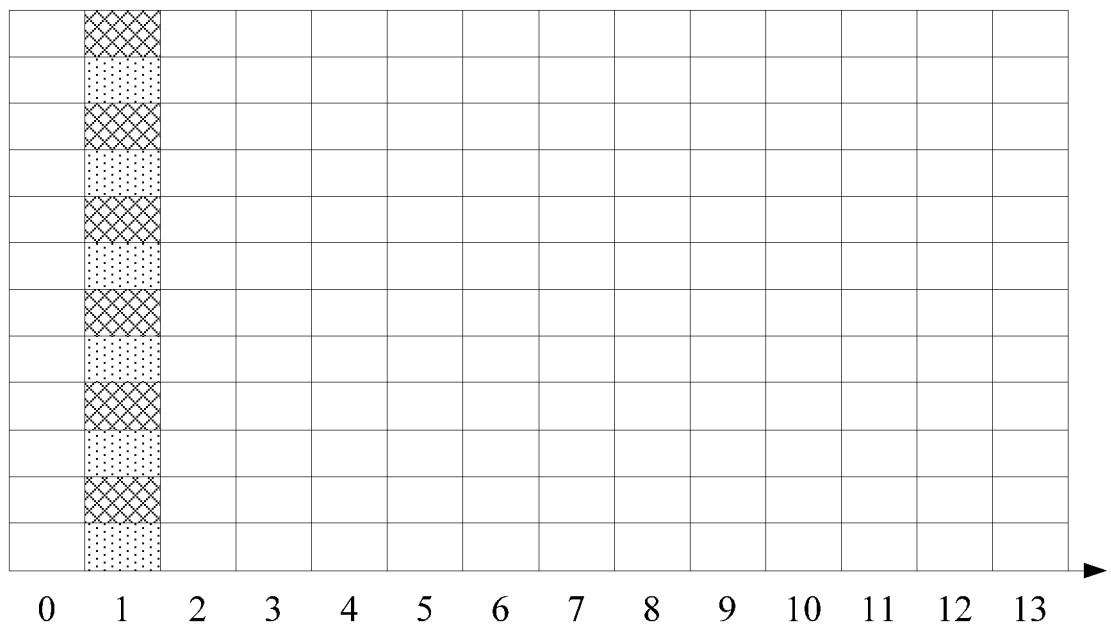
FIG. 4 is a schematic diagram of a DMRS pattern of one DMRS symbol of DMRS type 1 according to an embodiment of the present disclosure.
Figure 5:
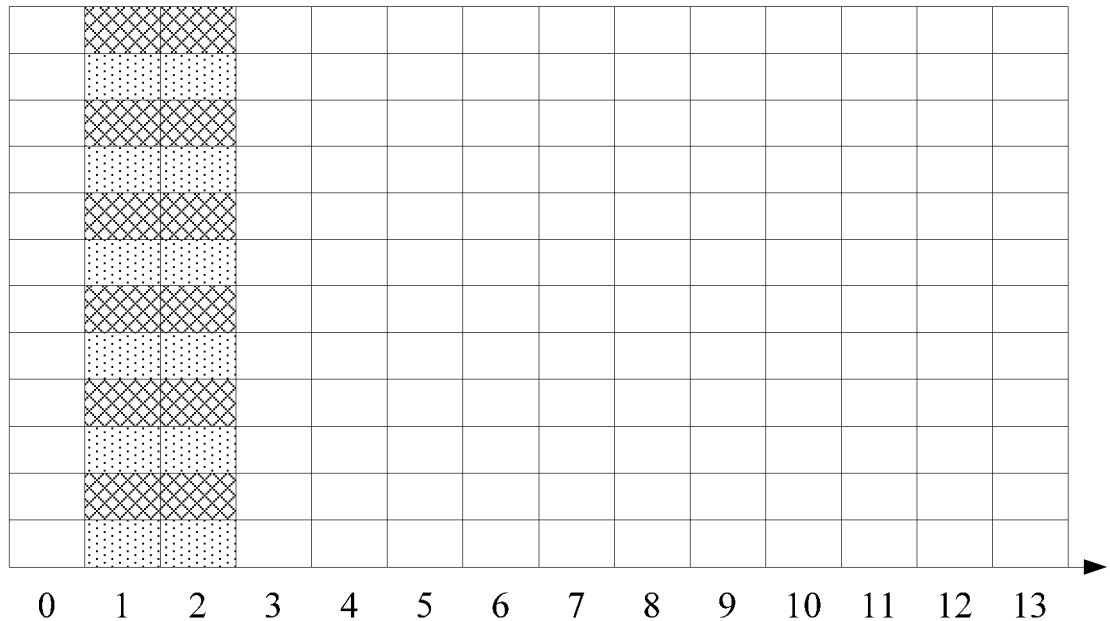
FIG. 5 is a schematic diagram of a DMRS pattern of two DMRS symbols of DMRS type 1 according to an embodiment of the present disclosure.

Referring to FIG. 4 and FIG. 5, FIG. 4 shows a schematic diagram of a DMRS pattern of one DMRS symbol of DMRS type 1 and FIG. 5 shows a schematic diagram of a DMRS pattern of two DMRS symbols of DMRS type 1. In FIG. 4, a shaded pattern filled with black dots represents port p0/p1, and a shaded pattern filled with square grids represents port p2/p3. In FIG. 5, a shaded pattern filled with black dots represents port p0/p1/p4/p5, and a shaded pattern filled with square grids represents port p2/p3/p6/p7. For DMRS type 1, all DMRS ports are divided into 2 CDM groups, and DMRS ports in each CDM group occupy identical time-frequency resources and are distinguished by using different orthogonal convolutional codes (OCCs).

Figure 6:
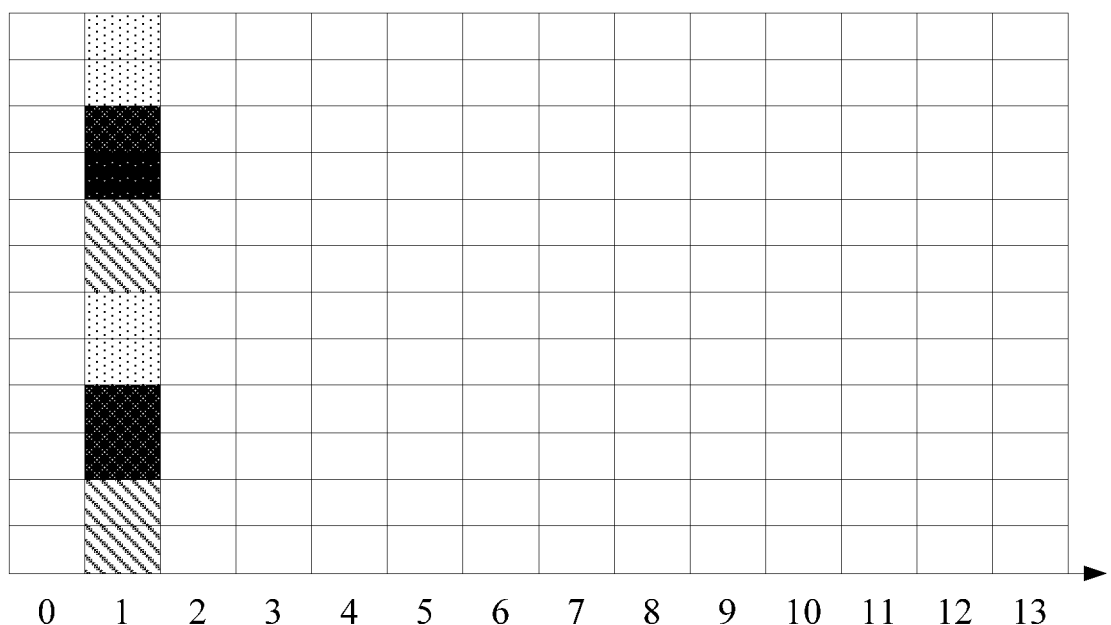
FIG. 6 is a schematic diagram of a DMRS pattern of one DMRS symbol of DMRS type 2 according to an embodiment of the present disclosure.
Figure 7:
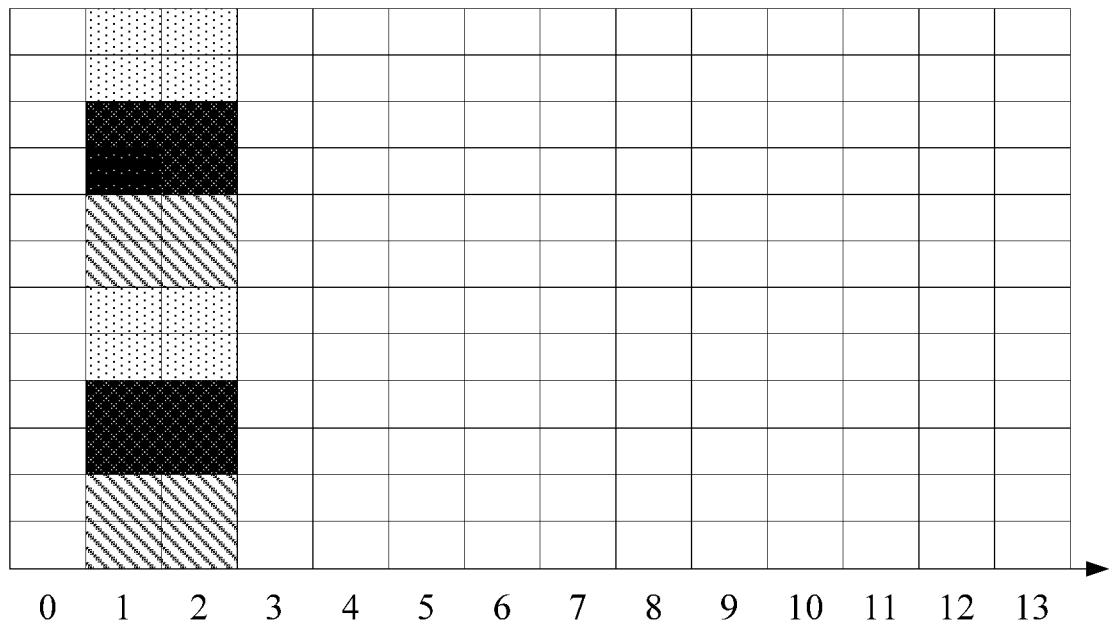
FIG. 7 is a schematic diagram of a DMRS pattern of two DMRS symbols of DMRS type 2 according to an embodiment of the present disclosure.

Referring to FIG. 6 and FIG. 7, FIG. 6 shows a schematic diagram of a DMRS pattern of one DMRS symbol of DMRS type 2 and FIG. 7 shows a schematic diagram of a DMRS pattern of two DMRS symbols of DMRS type 2. In FIG. 6, a shaded pattern filled with slashes represents port p0/p1, a black-filled pattern represents port p2/p3, and a shaded pattern filled with black dots represents port p4/p5. In FIG. 7, a shaded pattern filled with slashes represents port p0/p1/p6/p7, a black-filled pattern represents port p2/p3/p8/p9, and a shaded pattern filled with black dots represents port p4/p5/p10/p11. For DMRS type 2, all DMRS ports are divided into 3 CDM groups, as shown in FIG. 6 and FIG. 7. DMRS ports in each CDM group occupy identical time-frequency resources and are distinguished by using different OCCs.

Since the multiple TRPs may be located at different geographic locations, the time-frequency offset synchronization of the downlink transmission of multiple TRPs may be deviated. Therefore, it is preferable to divide the DMRS ports of multiple TRPs into multiple DMRS port groups, and DMRS ports of the different DMRS ports groups are allocated in different CDM groups.

In the multi-TRP transmission, the transmission layers of the multi-TRP transmission are generally independent of each other for the non-uRLLC service or for the user with good channel conditions in the uRLLC service. In order to reduce the change to the related standard, if the total number of the transmission layers of the multi-TRP transmission is less than or equal to 4, totally one TB is transmitted, and the multiple transmission layers corresponding to the TB can be from different TRPs; if the total number of the transmission layers is greater than 4, two TBs need to be transmitted. For the uRLLC service, especially for the user required to increase reliability, it is preferable that multiple TRPs transmit one TB. In order to increase the reliability, one TRP transmission may have a same TB as another TRP or have a related TB to another TRP. When multiple TBs are the same, the RVs of the multiple TBs may be different in order for the user side to perform different RV combining on each TB. In this case, a DMRS port indicator table corresponding to the multi-TRP transmission needs to include two parts, where one part includes DMRS port indicator information for improving transmission reliability, that is, multiple TBs transmitted by multiple TRPs are the same or related; the other part includes DMRS port indicator information for representing that the transmission layers of the multi-TRP transmission are independent. Since one DMRS port group corresponds to transmission of one TRP, in this case, a number of DMRS port groups is equal to a number of TBs.

In other words, when the TCI state indicated by the TRP using the TCI field in the DCI corresponds to multiple TCIs, or the corresponding TCIs include multiple QCL RS sets, the TB information depends on the DMRS port indicator. Referring to the DMRS pattern shown in FIG. 4, when the TCI state indicated by the TRP using the TCI field in the DCI corresponds to multiple TCIs, or the corresponding TCIs include multiple QCL RS sets, the DMRS port indicator is as shown in Table 1.

TABLE 1

A code word: code word 0 enabled, code word 1 disabled

| Index value | Number of DMRS CDM groups without data | DMRS Port allocation | Number of pre-loaded symbols | In a case of 2 TBs, whether the 2 TBS are the same | Number of TBs |
|---|---|---|---|---|---|
| 0 | 2 | 0; 2 | 1 | Yes | 2 |
| 1 | 2 | 0, 1; 2, 3 | 1 | Yes | 2 |
| 2 | 2 | 0; 2 | 1 | No | 1 |
| 3 | 2 | 0, 1; 2, 3 | 1 | No | 1 |
| 4 | 2 | 0, 1; 2 | 1 | No | 1 |
| 5 | 2 | 0; 2, 3 | 1 | No | 1 |
| 6-15 | Reserved | Reserved | Reserved | Reserved | Reserved |

Table 1 shows a case where a maximum length is 1 (maxLength=1) of DMRS type 1 (DMRS type=1), and the TCI state corresponds to multiple TCIs, or the corresponding TCI includes multiple QCL RS sets: when the TCI state corresponds to 2 TCIs, or the corresponding TCI includes 2 QCL RS sets, the number of DMRS port groups is 2. If an index value of the DCI port indicator is zero, that is, Index value=0, this represents that port 0 and port 2 are from two DMRS port groups and respectively correspond to one TB, and the two TBs are the same or related, or are repeated transmissions of one TB. In this case, although the number of total transmission layers does not exceed 4, two TBs are still used for the transmission. If an index value of the DCI port indicator is 2, it represents that port 0 and port 2 are respectively from two DMRS port groups and correspond to one TB totally, and two transmission layers of the TB are not in a repetition relationship.

In the column "DMRS port allocation" in Table 1, DMRS ports of a first DMRS port group are given before the semicolon, and DMRS ports of a second DMRS port group are given after the semicolon. Since the DMRS port indicator is dynamic, it can dynamically support whether the multi-TRP transmission is a repeated transmission. In addition, as can also be seen from Table 1, compared to the single TRP transmission, the DMRS table for the multi-TRP transmission has smaller overhead without any additional DCI overhead. The DMRS port indicator table is a mapping relationship of DMRS port indicators.

In conclusion, when the TCI state indicated by the TCI field in the DCI for the TRP corresponds to N TCIs, or the corresponding TCIs include N QCL RS sets, the number of DMRS port groups is N. In this case, the corresponding DMRS table includes two parts: the DMRS port indicators contained in a first part corresponds to N TBs, and the N TBs are the same or related; the DMRS port indicators included in the second part corresponds to one TB (at this time, the number of total DMRS ports is less than or equal to 4, or only one MCS/RV/NDI field is configured in a higher layer, that is, only one CW at most exists or a number of rank indicators (RIs) is not more than 4). When two TRPs are repeatedly transmitted, since two TBs always repeat, the number of transmission layers, MCSs, NDIs for two TRP transmissions are the same. Therefore, two DMRS port groups include a same number of DMRS ports, and the total number of DMRS ports may be 2, 4, 6, or 8.

In the case where the total number of the DMRS ports is less than or equal to 4, or only one MCS/RV/NDI field is configured in a higher layer, or only one CW at most exists or the number of RIs is not more than 4, only one RV indicator is in the DCI, and in this case, in order to combine the RVs of a same TB transmitted by multiple TRPs to the receiving side, the RVs of multiple TBs are preferably different. In one example of this embodiment, a relationship between RVs of the first TB and the second TB may be predefined, for example, when two DMRS port groups exist, the predefined relationship between the RVs of the first TB and the second TB may be as shown in Table 2.

TABLE 2

| RV of first TB | RV of second TB |
|---|---|
| 0 | 2 |
| 2 | 3 |
| 3 | 1 |
| 1 | 0 |

It should be understood that, in some other examples of this embodiment, the predefined relationship between the RVs of the first TB and the second TB may also be in other forms, for example, if the RV of the first TB is 0, then correspondingly, the RV of the second TB is 1; if the RV of the first TB is 1, the RV of the second TB is 2 correspondingly; if the RV of the first TB is 2, the RV of the second TB is 3 correspondingly; the RV of the first TB is 3, and correspondingly the RV of the second TB is 0.

Figure 8:
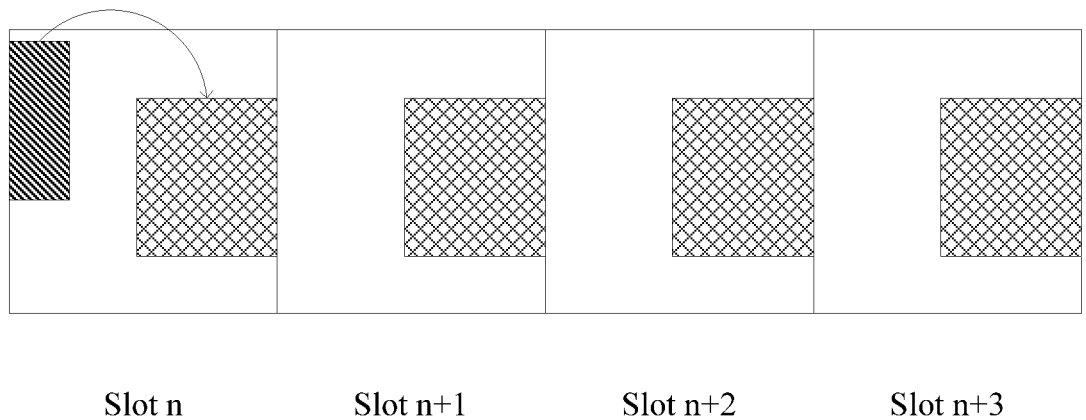
FIG. 8 is a schematic diagram of multi-slot scheduling according to an embodiment of the present disclosure.

For multi-slot scheduling, that is, a parameter downlink aggregation factor (aggregation Factor DL) configured by the higher layer being greater than 1, identical time-frequency resources are allocated on consecutive aggregation factors DL slots, and it can be assumed that TBs on the slots are all repeated. At this time, in a case of multi-TRP scheduling, the PDSCH on each slot has multiple TBs, for example two DMRS port groups, as shown in FIG. 8. In FIG. 8, a shaded pattern filled with slashes represents the PDCCH, and a shaded pattern filled with square grids represents the PDSCH. In order to make the RVs of the repeated TBs different, TBs can be sorted in an order of in-slot first and then between slots. Assuming that a total of 8 repeated TBs exist in FIG. 8, and 2 TBs exist on each slot, then the TBs are sorted in an order 0, 1, 2, 3, . . . 7 and correspond to a TB0 in slot n, a TB1 in slot n, a TB0 in slot n+1, a TB1 in slot n+1, . . . a TB1 in slot n+3. Then, RV values are performed on two TBs at the same moment and multiple TBs at different moments according to the predefined RV relationship. Then in the order of TBs, the relationship of RVs is as follows. In Table 3, a transmission occasion refers to a PDSCH transmission of a certain slot in multi-slot scheduling.

TABLE 3

| RV of DCI scheduling PDSCH | RVs applied in the n-th transmission occasion | | | |
|---|---|---|---|---|
| | n mod 4 = 0 | n mod 4 = 1 | n mod 4 = 2 | n mod 4 = 3 |
| 0 | 0, 2 | 3, 1 | 0, 2 | 3, 1 |
| 2 | 2, 3 | 1, 0 | 2, 3 | 1, 0 |
| 3 | 3, 1 | 0, 2 | 3, 1 | 0, 2 |
| 1 | 1, 0 | 2, 3 | 1, 0 | 2, 3 |

Table 3 shows the RVs applied in each transmission occasion when the TCI state corresponds to multiple TCIs or the corresponding TCIs include multiple QCL RS sets, multiple TBs are repeated in the slot, and the aggregation factor DL>1. In Table 3, the RV applied to the first TB is given before ",", and the RV applied to the second TB is given after ",".

In R15, when performing the multi-slot scheduling, the number of slots of PDSCH scheduled at one time is configured by high-level signaling and cannot be changed in DCI. However, whether the multi-TRP transmission is performed, and whether the multi-TRP transmission transmit multiple TBs repeatedly and dynamically. If a number of slots which are repeated in the time-domain and configured to terminal by the base station higher layer is M, in certain multi-slot scheduling, not single TRP scheduling but multi-TRP scheduling transmits multiple repetitions of the TB, a number M of transmissions is not required to correctly demodulate data sent by the terminal. Referring to FIG. 8, compared to the R15 solution, when radio resource control (RRC) configures a transmission of 4 (that is, M=4) slots, the base station actually repeats 8 transmissions for the same TB. Therefore, the actual number of transmitted slots is often less than M. However, if certain multi-slot scheduling is not a repetition of multiple TRPs transmitting multiple TBs, a transmission of M slots is still required. Therefore, in the multi-slot scheduling, the M1 slots actually transmitted may be determined by the value of M configured by the higher layer and whether the scheduling is the repetition of multiple TRPs transmitting multiple TBs. For example, when certain multi-slot scheduling is the multi-TRP transmission and N times of repeated transmissions are performed at a time, M1=M/N (or M1=⌈M/N⌉ or M1⌊M/N⌋, otherwise M1=M.

The relationship between the RVs of two TBs may be implemented according to the predefined method described above, but in this solution the order of the two TBs is always a circular order of 0, 2, 3, 1, 0, 2, 3, 1 . . . . To further improve the flexibility of the predefined relationship between RVs, the predefined relationship of RV values for the two TBs may be determined according to the value of the TCI. For example, when the value of the TCI state of 3 bits in the DCI is 0, the predefined relationship between two repeated TBs is shown in Table 2, and when the value of TCI state is 1, the predefined relationship between two repeated TBs is shown in Table 4:

TABLE 4

| RV of the first TB | RV of second TB |
|---|---|
| 0 | 3 |
| 2 | 1 |
| 3 | 0 |
| 1 | 2 |

It can be seen that, in the solution of the present embodiment, not only the flexibility of the predefined relationship between the RVs of two TBs is increased, but also the overhead of the DCI is not increased.

Embodiment 4

According to the introduction of the foregoing embodiment, if the higher layer configures only one TB at most (or the higher layer configures no more than 4 total transmission layers supported by the terminal, or the higher layer configures only 1 CW at maximum, or the higher layer configures only one MCS/RV/NDI field, or the higher layer parameter "max Nrof Code Words Scheduled By DCI=1 (that is, a maximum number of CWs configured by the higher layer is 1)), in a case of the single TRP transmission or the multi-TRP transmission without repetition, one TB is transmitted actually. For the case of multi-TRP transmission and repeated transmission, N TRPs correspond to N DMRS port groups, that is, N TBs are transmitted and are repeated, and RV versions may be different.

With reference to FIG. 5 and FIG. 7, if the DMRS pattern supports more than 4 ports, even if the higher layer only configures 1 TB at most, the terminal may still be configured with more than 4 ports for the case of repeated transmission of multiple TRPs. For example, when two TRPs repeatedly transmit, because of repetition of two TBs, the number of transmission layers, MCSs, NDIs for two TRP transmissions are the same. Therefore, two DMRS port groups include a same number of DMRS ports, and the total number of DMRS ports may be 2, 4, 6, or 8. At this time, it is not required to have two MCS/RV/NDI fields to inform the MCS/RV/NDI of the two TBs respectively, because the MCS/NDI of the second TB is the same as that of the first TB, and the RV of the second TB and the RV of the first TB have a predefined relationship. Thus, in this case, the number of scheduled transmission layers may still be greater than 4. When the DCI has only 1 MCS/RV/NDI field, the TCI state indicated by the base station through the TCI field in the DCI corresponds to N TCIs, or the corresponding TCIs include N QCL RS sets, the number of DMRS port groups is N. At this time, the corresponding DMRS table includes two parts: the DMRS port indicator contained in the first part corresponds to N TBs, and the N TBs are the same or related; the DMRS port indicator contained in the second part corresponds to one TB, and the total number of DMRS ports is less than or equal to 4. In the first part, a number of DMRS ports corresponding to some DMRS port indicators is more than 4, for example, may be 6 or 8. In the case of two DMRS port groups (or N=2), the two DMRS port groups respectively have 3 or 4 ports, and the capability of the terminal is required to support a transmission of more than 4 layers; and when N=1, only one DMRS port group exists, which is not different from the DMRS table of R15, that is, only 1 TB transmission exists when 1 CW at most is configured in the higher layer, and the number of DMRS ports is not more than 4.

For example, for the case shown in FIG. 5, that is, when only 1 MCS/RV/NDI field exists in the DCI (or max Nrof Code Words Scheduled By DCI=1), the DMRS port indicator table when N=2 is as shown in Table 5.

TABLE 5

A code word: code word 0 enabled, code word 1 disabled

| Index value | Number of DMRS CDM groups without data | DMRS Ports | Number of pre-loaded symbols | In a case of 2 TBs, whether the 2 TBS are the same | Number of TBs |
|---|---|---|---|---|---|
| 0 | 2 | 0; 2 | 1 | Yes | 2 |
| 1 | 2 | 0; 2 | 2 | Yes | 2 |
| 2 | 2 | 0, 1; 2, 3 | 1 | Yes | 2 |
| 3 | 2 | 0, 1; 2, 3 | 2 | Yes | 2 |
| 4 | 2 | 0, 1, 4; 2, 3, 6 | 2 | Yes | 2 |
| 5 | 2 | 0, 1, 4, 5; 2, 3, 6, 7 | 2 | Yes | 2 |
| 6 | 2 | 0; 2 | 1 | No | 1 |
| 7 | 2 | 0; 2 | 2 | No | 1 |
| 8 | 2 | 0, 1; 2, 3 | 1 | No | 1 |
| 9 | 2 | 0, 1; 2, 3 | 2 | No | 1 |
| 10 | 2 | 0, 1; 2 | 1 | No | 1 |
| 11 | 2 | 0; 2, 3 | 1 | No | 1 |
| 12-31 | Reserved | Reserved | Reserved | Reserved | Resered |

Table 5 shows a DMRS port indicator table with a maximum length of 2 (maxLength=2) under DMRS type 1 (DMRS type=1): the index value of the DMRS port indicator is equal to 0 to 5 corresponds to the first part and that the index values equal to 6 to 9 corresponds to the second part. When the index value is equal to 4, the total number of the corresponding DMRS ports is 6, and when the index value is equal to 5, the total number of the corresponding DMRS ports is 8, that is, each DMRS port group has 3 or 4 DMRS ports.

Embodiment 5

The embodiment 4 described above shows a case where the higher layer configures only one MCS/RV/NDI field, and now a case where the higher layer configures two MCS/RV/NDI fields in the DCI the will be described.

In the case where the higher layer configures two MCS/RV/NDI fields in the DCI (or max Nrof Code Words Scheduled By DCI=2), but not the case of the multi-TRP repeated transmission, the number of TBs is determined by the activation of CW. If one TB is deactivated (such as, MCS/RV=26/1), the number of TBs actually transmitted is 1, and the number of DMRS ports is less than or equal to 4; otherwise, the number of actually transmitted TBs is 2, and the number of DMRS ports is 5 to 8. For the case where the number of actually transmitted TBs is 2, MCSs/RVs/NDIs of the two TBs are separately indicated.

In the case where a transmission is the multi-TRP transmission and the repeated transmission, the number of the TBs always is 2. If the two TBs each are activated, the MCSs/NDIs of the two TBs also have a same value, but the RVs of the two TBs may be different, which may increase the combining gain. At this time, the RVs of the two TBs may have a predefined relationship, because the DCI have two RV state fields, and RV the values of the two TBs may be notified by the two RV state fields respectively. In this case, the number of DMRS ports may be required to exceed 4 for two DMRS CDM groups, in order to be consistent with the non-repeated transmission. If only 1 TB is activated, the MCSs/NDIs of the two TBs have the same value, and the RVs have a predefined relationship. In order to be consistent with the non-repeated transmission, It may be required that the number of ports of the DMRS does not exceed 4.

In the case where the higher layer configures two MCS/RV/NDI fields in the DCI, when two TBs each are activated, the number of DMRS ports is more than 4: when N>1 (such as, equal to 2), N DMRS port groups exist, and DMRS ports of each DMRS port indicator are divided into two groups, which come from two TRPs. The DMRS port indicator table is divided into at least two parts, where in the first part, two TBs of the DMRS port indicator are repeated, and the total port number of ports is generally only 6, 8, such as the index value is equal to 0 or 1 in the following Table 6 (DMRS type=1, maxLength=2); in the second part, the 2 TBs of the DMRS port indicator are independent, and the total port number is generally only 5 to 8, for example, the index value is equal to 2 to 7 in Table 6. It can be seen that the total number of DMRS ports is even in the case where multiple TRPs are repeated. Optionally, a case where the TBs are repeated, and the number of DMRS ports is more than 4 may be directly sorted into a case of one TB, as shown in Table 5. If the DMRS port indicator table is divided into at least three parts, another part may be the case of the single RRP transmission, that is, only one DMRS port group exists or N=1.

TABLE 6

A code word: code word 0 enabled, code word 1 disabled

| Index value | Number of DMRS CDM groups without data | DMRS Ports | Number of pre-loaded symbols | In a case of 2 TBs, whether the 2 TBS are the same | Number of TBs |
|---|---|---|---|---|---|
| 0 | 2 | 0, 1, 4; 2, 3, 6 | 2 | Yes | 2 |
| 1 | 2 | 0, 1, 4, 5; 2, 3, 6, 7 | 2 | Yes | 2 |
| 2 | 2 | 0, 1, 4; 2, 3 | 2 | No | 2 |
| 3 | 2 | 0, 1; 2, 3, 6 | 2 | No | 2 |
| 4 | 2 | 0, 1, 4; 2, 3, 6 | 2 | No | 2 |
| 5 | 2 | 0, 1, 4, 5; 2, 3, 6 | 2 | No | 2 |
| 6 | 2 | 0, 1, 4; 2, 3, 6, 7 | 2 | No | 2 |
| 7 | 2 | 0, 1, 4, 5; 2, 3, 6, 7 | 2 | No | 2 |
| 8-31 | Reserved | Reserved | Reserved | Reserved | Reserved |

When N=1, only one DMRS port group exists, and this case may be referred to the DMRS indicator table of R15.

For the case where the higher layer configures two MCS/RV/NDI fields in the DCI, when only one TB is activated: when N>1, the case may refer to the introduction in embodiment 3 and embodiment 4; when N=1, only one DMRS port group exists, the case may refer the following Table 7.

TABLE 7

Two code words: code word 0 enabled, code word 1 enabled

| Index value | Number of DMRS CDM groups without data | DMRS Ports | Number of pre-loaded symbols |
|---|---|---|---|
| 0 | 2 | 0-4 | 2 |
| 1 | 2 | 0, 1, 2, 3, 4, 6 | 2 |
| 2 | 2 | 0, 1, 2, 3, 4, 5, 6 | 2 |

TABLE 7-continued

Two code words: code word 0 enabled, code word 1 enabled

| Index value | Number of DMRS CDM groups without data | DMRS Ports | Number of pre-loaded symbols |
|---|---|---|---|
| 3 | 2 | 0, 1, 2, 3, 4, 5, 6, 7 | 2 |
| 4-31 | reserved | reserved | reserved |

Embodiment 6

For the case where the DCI configured by the higher layer includes two MCS/RV/NDI fields, the present embodiment provides another solution.

For the service requiring high reliability in uRLLC, two MCS/RV/NDI fields can always be configured and two TBs are always activated. At this time, the DMRS port indicator table where two CWs are activated includes the multi-TRP repeated transmission. Table 7 shows the DMRS port indicator table when two CWs each are activated in the related art, where that the index value is equal 4 to 31 is reserved and not used. Therefore, part of indicator index values can be added based on Table 7 to indicate whether the two TBs are repeatedly transmitted when the total number of DMRS ports is 2, 4, 6, or 8, as shown in Table 8.

TABLE 8

Two code words: code word 0 enabled, code word 1 enabled

| Index value | Number of DMRS CDM groups without data | DMRS Ports | Number of pre-loaded symbols | In a case of 2 TBs, whether the 2 TBS are the same |
|---|---|---|---|---|
| 0 | 2 | 0-4 | 2 | No |
| 1 | 2 | 0, 1, 2, 3, 4, 6 | 2 | No |
| 2 | 2 | 0, 1, 2, 3, 4, 5, 6 | 2 | No |
| 3 | 2 | 0, 1, 2, 3, 4, 5, 6, 7 | 2 | No |
| 4 | 2 | 0; 2 | 1 | Yes |
| 5 | 2 | 0, 1; 2, 3 | 1 | Yes |
| 6 | 2 | 0; 2 | 2 | Yes |
| 7 | 2 | 0, 1; 2, 3 | 2 | Yes |
| 8 | 2 | 0, 1, 4; 2, 3, 6 | 2 | Yes |
| 9 | 2 | 0, 1, 4, 5; 2, 3, 6, 7 | 2 | Yes |
| 10-31 | reserved | reserved | reserved | reserved |

In Table 8, if the index value of the DMRS indicator is equal to 4 to 9, the two TBs are correlated and are transmitted repeatedly.

Therefore, the DMRS port indicator with repeated TBs when N>1 and the total number of DMRS ports being less than or equal to 4 are also placed in the table. The case of repeated TBs can also be regarded as the case of two TBs, and the two TBs are just the same. As shown in Table 9, in the case where the two CWs each are activated, the repeated TBs depends on the port indicator of the DMRS. When N>1 (for example, equal to 2), N DMRS port groups exist, and the DMRS port indicator of each DMRS port is divided into two groups, which come from two TRPs. The DMRS port indicator table is divided into at least two parts. In the first part, the two TBs of the DMRS port indicator are repeated, and the total number of ports can only be 2, 4, 6, or 8, as shown in Table 9, Index value=0, 1, 8, 9, 10, 11. In the second part, the two TBs of the DMRS port indicator are independent, generally, the total number of ports can only be 5 to 8, as shown in Table 9, index value is equal to 2 to 7. If the DMRS port indicator table is divided into three parts, another part may be the case of the single RRP transmission, that is, only one DMRS port group exists or N=1.

TABLE 9

Two code words: code word 0 enabled, code word 1 enabled

| Index value | Number of DMRS CDM groups without data | DMRS Ports | Number of pre-loaded symbols | In a case of 2 TBs, whether the 2 TBS are the same | Number of TBs |
|---|---|---|---|---|---|
| 0 | 2 | 0, 1, 4; 2, 3, 6 | 2 | Yes | 2 |
| 1 | 2 | 0, 1, 4, 5; 2, 3, 6, 7 | 2 | Yes | 2 |
| 2 | 2 | 0, 1, 4; 2, 3 | 2 | No | 2 |
| 3 | 2 | 0, 1; 2, 3, 6 | 2 | No | 2 |
| 4 | 2 | 0, 1, 4; 2, 3, 6 | 2 | No | 2 |
| 5 | 2 | 0, 1, 4, 5; 2, 3, 6 | 2 | No | 2 |
| 6 | 2 | 0, 1, 4; 2, 3, 6, 7 | 2 | No | 2 |
| 7 | 2 | 0, 1, 4, 5; 2, 3, 6, 7 | 2 | No | 2 |
| 8 | 2 | 0; 2 | 1 | Yes | 2 |
| 9 | 2 | 0, 1; 2, 3 | 1 | Yes | 2 |
| 10 | 2 | 0; 2 | 2 | Yes | 2 |
| 11 | 2 | 0, 1; 2, 3 | 2 | Yes | 2 |
| 12-31 | Reserved | Reserved | Reserved | Reserved | Reserved |

Embodiment 7

For the uRLLC service requiring high reliability, the present embodiment also provides some other example solutions.

Example 1

In this example, the case where two TBs are not repeated is not supported, that is, two MCS/RV/NDI fields are always configured and two TBs are always activated. At this time, by default, the two TBs have the correlation, for example, the two TBs are the same or related. In other words, for the uRLLC service, that is, a service scrambled with MCS-C-RNTI, when the two TBs are activated, it means that the two TBs are repeated. The RVs of the two TBs are respectively notified by two RV fields in the DCI. At this time, generally, the DMRS port indicator table includes only one part, that is, only the case of only including two repeated TBs, that is, only a transmission of 2 layers, 4 layers, 6 layers, and 8 layers are supported, as shown in Table 10.

TABLE 10

Two code words: code word 0 is enabled and code word 1 is enabled

| value | Number of DMRS CDM groups without data | DMRS Ports | Number of pre-loaded symbols | In a case of 2 TBs, whether the 2 TBS are the same | Number of TBs |
|---|---|---|---|---|---|
| 0 | 2 | 0, 1, 4; 2, 3, 6 | 2 | Yes | 2 |
| 1 | 2 | 0, 1, 4, 5; 2, 3, 6, 7 | 2 | Yes | 2 |

TABLE 10-continued

Two code words: code word 0 is enabled and code word 1 is enabled

| value | Number of DMRS CDM groups without data | DMRS Ports | Number of pre-loaded symbols | In a case of 2 TBs, whether the 2 TBS are the same | Number of TBs |
|---|---|---|---|---|---|
| 2 | 2 | 0; 2 | 1 | Yes | 2 |
| 3 | 2 | 0, 1; 2, 3 | 1 | Yes | 2 |
| 4 | 2 | 0; 2 | 2 | Yes | 2 |
| 5 | 2 | 0, 1; 2, 3 | 2 | Yes | 2 |
| 6-31 | Reserved | Reserved | Reserved | Reserved | Reserved |

In other words, for the service scrambled with MCS-C-RNTI, the values of MCS and RV are used to determine whether two TBs are activated. If the two TBs each are activated, the two TBs are related or the same, that is, the number and correlation of TBs are determined by using the values of MCS and RV.

Another solution is that the base station configures whether the UE supports a transmission manner in which N parts are repeated through higher layer signaling. If the UE supports, the technical solution in the present disclosure is applicable, otherwise, by default, the N transmission parts are not related.

Example 2

The multi-TRP transmission is always considered to be a case of repetition, that is, for the data transmission scrambled with MCS-C-RNTI, when the TCI state indicated by the TCI field corresponds to R TCIs, or the corresponding TCIs include R QCL RS set, when R>1, the two TBs sent have the correlation. This method is relatively simple and can reduce complexity of the terminal to a certain extent. Since R is notified by the value of the TCI state, it can be said that the correlation of N parts is determined by the value of the TCI state. Similarly, the higher layer parameter can be introduced to configure whether N parts are repeated when R>1. If the configuration of the higher layer parameter is a repeated transmission manner, then R>1 corresponds to a repeated multi-TRP transmission solution; if the configuration of the higher layer parameter is a non-repeated transmission manner, then R>1 corresponds to an ordinary multi-TRP transmission, that is, N parts are not repeated.

When the higher layer configures only one MCS/RV/NDI field, the relationship between the RVs of the two TBs can be predefined. Specific details can refer to the introduction in embodiment 3.

Embodiment 8

In some examples of the present embodiment, if the higher layer configures two MCS/RV/NDI fields, the TRP can also use the relationship between the two NDI fields to indicate to the terminal whether the corresponding two TBs have the correlation.

Figure 9:
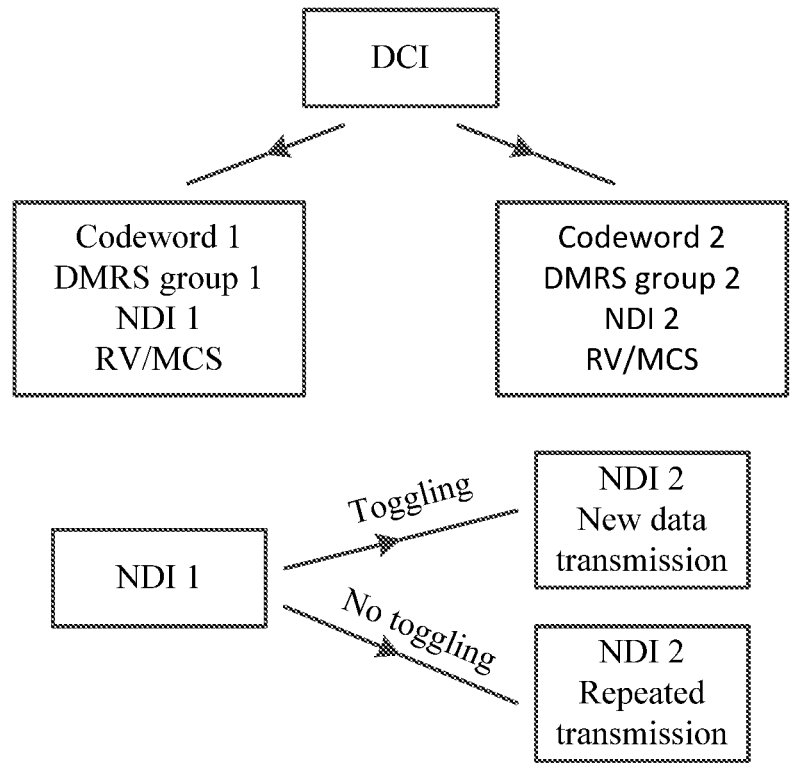
FIG. 9 is a schematic diagram of indication of whether two transmission blocks have a correlation based on NDI toggling according to an embodiment of the present disclosure.

Referring to FIG. 9, TRP indicates whether the two TBs have the correlation based on whether the NDIs corresponding to the two TBs belong to the NDI toggling. The NDI toggling means that the NDIs corresponding to the two TBs have different values. For example, a value of the NDI corresponding to CW1 meets: NDI1=1. If NDI is toggled, then a value corresponding to CW2 meets: NDI2=0, that is, the value of NDI2 is changed with respect to the value of NDI1. This means that the data on CW2 and the data on CW1 are independent, that is, TB1 and TB2 are not repeated. In a case of no NDI toggling, then the value corresponding CW2 meets: NDI2=1, that is, the value of NDI2 is not changed with respect to the value of NDI1, this means that the data on CW2 and the data on CW1 are repeated, that is, TB1 and TB2 are repeated.

Further, a hybrid automatic repeat request (HARQ) process number or a HARQ process ID can be configured for each CW or each TB. Only when the HARQ process numbers corresponding to the two CWs are the same, that is, the NDIs corresponding to the two CWs are not toggled, the TBs corresponding to the two CWs are repeated, otherwise the TBs are not duplicated.

Embodiment 9

According to the foregoing embodiments, whether two TBs are repeated can be implicitly indicated by one or more of values of the TCI, the DMRS port indicator, or the configured MCS/RV/NDI. When the two TBs transmitted in a PDSCH are independent, if the A/N bundling is not configured, the terminal needs to feed back two A/Ns to the TRP at this time to inform the base station whether the two TBs are transmitted correctly. But when two TBs are repeated, it is not required to feed back two A/Ns to the TRP. At this time, the terminal only needs to feed back one A/N to the TRP, that is, a number or digit fed back by the A/N is determined by whether the two TB are repeated. Therefore, the number or digit fed back by the A/N is indirectly determined by one or more of values of the TCI, the DMRS port indicator, or the configured MCS/RV/NDI.

Embodiment 10

In the foregoing embodiments, it is assumed that: in a case where when the total number of transmission layers is less than or equal to 4, multiple TRPs transmit multiple TBs, and multiple TBs are in a repetition relationship, the RVs can be different to increase the combination gain. In order to be compatible with the related solutions, one TB can also be activated when the total number of layers is not more than 4. In this case, the data of multiple transmission layers in a TB may come from different TRPs, and transmission layers of different TRPs correspond to different DMRS port groups.

In order to increase the reliability, the above-mentioned solution of using one or more of values of the TCI, the DMRS port indicator, or the configured MCS/RV/NDI to determine whether multiple TBs are repeated can also be used to determine data layer corresponding to multiple DMRS port groups are repeated. That is, at least one of values of the TCI, the DMRS port indicator, or the configured MCS/RV/NDI is used to determine whether the multiple transmission layers have the correlation. This makes the standard design easier. In a case of two DMRS port groups or R=2, an actual size of the TB is about half of the size obtained according to the DCI configuration. This is because two sets of transmission layer data have repeated data.

According to the solution of the embodiment 3, the information of the multiple transmission layer groups of the PDSCH scheduled by the DCI needs to depend on the TCI indicator and the DMRS port indicator, where the information of the transmission layer group refers to a number of transmission layer groups and whether the multiple transmission layer groups are the same or related. The transmission layer groups correspond to the DMRS port groups one to one. The number of DMRS port groups is equal to the number R of TCIs corresponding to the TCI state indicated by the TCI field, or the number R of QCL RS sets included in the corresponding TCIs. The DMRS port group has a one-to-one correspondence with the R TCIs or the R QCL RS sets. When the TCI state indicated by the TCI field in the DCI corresponds to multiple TCIs or the corresponding TCI includes multiple QCL RS sets, the information of the transmission layer group depends on the DMRS port indicator.

In general, the TRP uses a DCI to schedule a data transmission at a certain time. The data transmission can include multiple subsets, and different subsets come from different TRPs. The subsets can have a relation (or a correlation) or be independent. The relation refers to mutual repetition, correlation, etc. The subset here can be the TB, that is, different TBs come from different TRPs, and the TBs can be repeated or not repeated. A subset here can also be a transmission layer corresponding to a DMRS port group, one or more transmission layers, and the transmission layers corresponding to different DMRS port groups come from different TRPs. The transmission layers corresponding to different DMRS port groups can be related or independent. Another case is that one subset corresponds to one PDSCH transmission, and different PDSCHs come from different TRPs. Of course, the subset here can also be explained in other ways. For example, a resource scheduled by DCI is divided into 2 blocks, and each block corresponds to a subset. Of course, it can also be said that the data scheduled by a DCI is divided into multiple parts, and each part is a subset.

Embodiment 11

In the above solution, it is assumed that one TRP transmits one beam. When the base station schedules the PDSCH, in a case of the multi-TRP scheduling, the value of the TCI field can correspond to R TCIs or correspond to R QCL RS sets in one TCI, where R>1. A QCL RS set can include multiple (for example, two) RS s, and each RS corresponds to a QCL type. Generally, the two QCL types are different. At this time, the value of R is the same as the number of DMRS port groups.

However, in a case of the multi-TRP transmission, and each TRP can still have multiple panels for sending multiple beams. In this case, the value of the TCI field can correspond to A TCIs, and each TCI can have one or more QCL RS sets, where A is greater than or equal to 1. In this case, the value of A is equal to the number of DMRS port groups, that is, among the multiple TCIs corresponding to the TCI indicator value, each TCI corresponds to a DMRS port group. At this time, in order to increase robustness, multiple beams of a TRP can correspond to a same DMRS port group, that is, multiple QCL RS sets included in a TCI (each QCL RS set corresponds to a beam) correspond to a same DMRS port group. Therefore, the number of DMRS port groups is less than or equal to a number of all QCL RS sets corresponding to the value of the TCI field. The number of all QCL RS sets corresponding to the value of the TCI field refers to the total number of QCL RS sets included in A TCIs corresponding to the value of the TCI field.

It is noted that the above solutions are generally used for the downlink transmission, that is, the downlink multi-TRP transmission, from the base station to the UE. When the UE has multiple antenna panels, the data sent by the multiple antenna panels may also be repeated. At this time, the TCI indicator is replaced by an uplink SRS resource indicator (SRI). Therefore, for the uplink transmission, the solution in the present disclosure can also be expressed as: dividing data scheduled by one DCI into N data parts, where N>1, and a value of N and whether the N data parts have a correlation in a case of N>1 are determined by at least one of following scheduling information: a value of the SRI, The DMRS port indicator, the MCS, the RV or the NDI. The two panels of the UE can be regarded as two TRPs.

The value of N may be equal to R, where R refers to a number of SRS resources corresponding to a SRI state, or a number of "spatial Relation Info" parameters included in the SRS resources corresponding to the SRI state.

When R is greater than 1, the base station may notify the terminal whether the N data parts have the correlation by using DMRS port indicator.

The solution described in the present disclosure may be applied to the uplink transmission if the TCI is changed to the SRI and the value of R is redefined.

Embodiment 12

Figure 10:
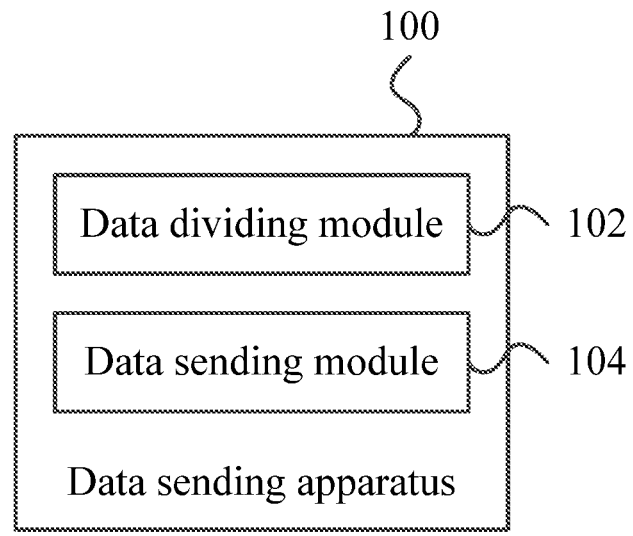
FIG. 10 is a structural diagram of a data sending apparatus according to an embodiment of the present disclosure.

An embodiment of the present disclosure further provides a data sending apparatus, and referring to FIG. 10, the data sending apparatus 100 includes a data dividing module 102 and a data sending module 104. The data dividing module 102 is configured to divide data scheduled by same DCI into N data parts, and the data sending module 104 is configured to transmit the N data parts to a receiving side.

Figure 11:
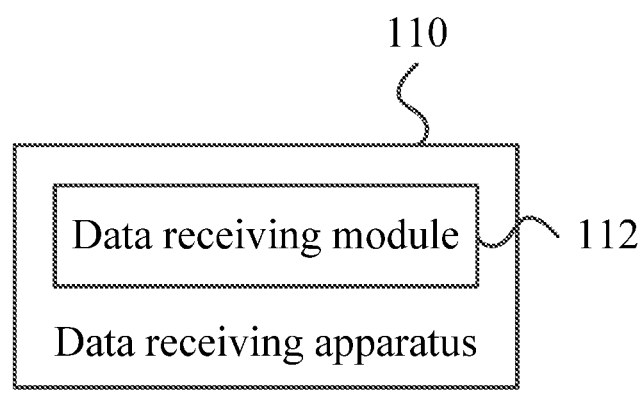
FIG. 11 is a structural diagram of a data receiving apparatus according to an embodiment of the present disclosure.

An embodiment of the present disclosure further provides a data receiving apparatus. Referring to FIG. 11, the data receiving apparatus 110 includes a data receiving module 112, and the data receiving module 112 is configured to receive N data parts sent by a TRP.

It should be understood that the data sending apparatus 100 may be deployed on a TRP (such as, a base station), the function of the data dividing module 102 may be implemented by a processor of the TRP, and the function of the data sending module 104 may be implemented by a communication apparatus of the TRP. The corresponding data receiving apparatus 110 may be disposed on the terminal, and the function of the data receiving module 112 may be implemented by a communication apparatus of the terminal.

Optionally, each data part of the N data parts corresponds to at least one of: one DMRS port group; one TB; one transmission layer group, where the transmission layer group includes at least one transmission layer; or one PDSCH.

In some examples of this embodiment, a value of N is determined by at least one of following scheduling information: a TCI field, a DMRS port indicator, a MCS, a RV or a NDI.

In some other examples of this embodiment, whether the N data parts have a correlation can be determined by at least one of following scheduling information: a TCI field, a DMRS port indicator, a MCS, a RV or a NDI. The "correlation" is that one data part is repeated with another data part or that one data part is correlated with another data part. The term "correlated" herein means that useful information which can be used for combining between two data parts is the same, and the data receiving apparatus 110 can perform combination and demodulation after the data receiving module 112 acquires the two data parts.

In some examples of this embodiment, the value of N and whether the N data parts have a correlation each can be determined by at least one of following scheduling information: the TCI indictor field, DMRS port indicator, MCS, RV or NDI.

In this embodiment, the value of N may be greater than or equal to 1, and it should be understood that when N is equal to 1, multiple data parts do not exist, and therefore, it may not be required to indicate the correlation between the data parts through one or more of the scheduling information described above. When N is greater than 1, it is required to indicate the correlation between the respective data parts to the data receiving apparatus 110 through at least one of the scheduling information described above.

In some examples of this embodiment, the value of N may be equal to R, where R refers to a number of TCIs corresponding to a TCI field, or a number of QCL RS sets in the TCIs corresponding to the TCI field.

In an exemplary embodiment, when R is greater than 1 (that is, the number of TCIs corresponding to the TCI field is more than 1, or the number of QCL RS sets in the TCIs corresponding to the TCI field is more than 1), the data sending apparatus can notify whether the N data parts have the correlation to the data receiving apparatus 110 by using the DMRS port indicator.

In general, a mapping relationship by a DMRS port indicator corresponding to a case where R is greater than 1 is different from a mapping relationship by a DMRS port indicator corresponding to a case where R is equal to 1. Assuming that the mapping relationship indicated by the DMRS port indicator corresponding to the case where R is equal to 1 is referred to as a "first mapping relationship", and the mapping relationship indicated by the DMRS port indicator corresponding to the case where R is greater than 1 is referred to as a "second mapping relationship", the first mapping relationship is different from the second mapping relationship. The "mapping relationship" may refer to a DMRS port indicator table. A DMRS port indicator table corresponding to the first mapping relationship may be an existing DMRS port indicator table in the related art, and a DMRS port indicator table corresponding to the second mapping relationship is a new DMRS port indicator table.

In some examples of this embodiment, if the DMRS port indicator characterizes that the N data parts have the correlation, the N data parts correspond to N TBs, that is, the N data parts correspond to the N TBs one to one. Optionally, a predefined relationship is satisfied between RVs of the N TBs. For example, assuming that the value of N is 2, that is, there are two TBs and RVs of the 2 TBs may satisfy the predefined relationship. For example, in the predefined relationship, when the RV of TB1 is 0, the RV of TB2 corresponds to 2; when the RV of TB1 is 2, the RV of TB2 corresponds to 3.

It should be understood that, when the RVs of N TBs satisfy the predefined relationship, RV fields in the DCI may be reduced, for example, generally, when the value of N is 2, two RV fields need to be included in the DCI, and are respectively used for indicating the RVs of two TBs. If the RVs of the two TBs satisfy the predefined relationship, only one RV field may be set in the DCI, the value carried by the RV field may indicate the RV of one of the TBs, and the RV of the other TB may be determined according to the value carried by the RV field and the predefined relationship.

In the above example, the data sending apparatus 100 mainly notifies the data receiving apparatus 110 of whether the N data parts have the correlation through the DMRS port indicator. In other examples of this embodiment, the data sending apparatus 100 may further notify the data receiving apparatus 110 whether the N data parts have the correlation by using a relationship between NDIs corresponding to the N data parts.

For example, assuming that a higher layer configures N NDI fields in the DCI, a relationship between the N NDI fields may be used for indicating whether the corresponding N TBs have a repetition relationship. That the value of N is 2 is taken as an example. The data sending apparatus 100 can indicate whether TB1 and TB2 are repeated to the data receiving apparatus 110 by whether values in the two NDI fields are the same, for example, a value of a NDI corresponding to CW1 is 1, and if a value of a NDI corresponding to CW2 is 0, the values in the two NDI fields are different, that is, NDI toggling occurs; at this time, data on CW2 is independent of data on CW1, that is, TB1 and TB2 are not repeated. If the value of the NDI corresponding to CW1 is 1 and the value of the NDI corresponding to CW is also 1, then NDI toggling does not occur, which indicates that the data on CW2 and the data on CW1 are repeated, that is, TB1 and TB2 are repeated.

In the foregoing examples, the value of N is equal to R, that is, the value of N is equal to the number of QCL RS sets included in the TCIs corresponding to the TCI field, but in other examples of this embodiment, the value of N may be less than the number of all QCL RS sets included in all TCIs corresponding to the TCI field.

In some examples of this embodiment, if the N data parts have the correlation, at least one of the following corresponding to the N data parts is the same: a number of DMRS ports, the MCS, or the NDI. For example, in an exemplary embodiment, if the N data parts have the correlation, the number of DMRS ports, the MCS, and the NDI which correspond to the N data parts each are same. For another example, in another exemplary embodiment, if the N data parts have the correlation, the number of DMRS ports and the NDI which correspond to the N data parts are same, but the MCS may be different.

After the data dividing module 102 divides the data scheduled by one DCI into N data parts, the data sending module 104 may transmit the N data parts to the data receiving module 112 of the data receiving apparatus 110.

In some occasions, the data sending apparatus may configure a number T2 of transmissions of data through the higher layer, and T2 represents a number of transmissions required for the data. For the data receiving apparatus 110, T2 is a number of receptions configured in the higher layer. When the value of T2 is greater than 1, the data sending apparatus 100 uses different time-domain resources to send the data. In this embodiment, the data dividing module 104 may divide the data into N data parts before the data sending module sends the data, and the N data parts may have a correlation, in this case, sending one time is equivalent to repeatedly sending the data N times. Therefore, when a number of sending times (or receptions) of data configured by the higher layer is T2 and the N data parts have the correlation, a number T1 of actual sending times (or receptions) may not need to reach T2. In an exemplary embodiment, the value of T1 can be T2/N.

It should be understood that, according to the foregoing introduction, the N data parts may be sent to the data receiving apparatus 110 through different data sending modules 104. Therefore, the data receiving module 112 can receive data parts from different data sending module 104, and then demodulate the data according to the correlation based on the foregoing scheduling information. If the N data parts have the correlation, the data receiving apparatus 110 can combine and demodulate the data; otherwise, the data receiving apparatus can independently demodulate the data parts.

After the data receiving apparatus 110 demodulates the received N data parts, the data receiving apparatus 110 may feed back the reception of the data to the data sending apparatus 100 according to the demodulation result. It should be understood that if the N data parts have the correlation, the data receiving apparatus 110 can perform joint feedback for the N data parts. For example, only one response message A/N is fed back for the N data parts. If the N data parts do not have the correlation, the data receiving apparatus 110 can perform independent feedback for the data parts. For the data sending apparatus 100, if the N data parts sent to the data receiving apparatus 110 have the correlation, only one A/N is received for one data transmission; if the N data parts sent by the data sending apparatus 100 to the data receiving apparatus 110 do not have the correlation, the data sending apparatus 10 can receive multiple A/Ns. For example, in some cases, the data sending apparatus 10 can receive N A/Ns.

According to the data sending apparatus and the data receiving apparatus provided in this embodiment, when the data sending apparatus sends downlink data to the data receiving apparatus, the data scheduled by one DCI can be divided into N data parts and the N data parts can be sent to the data receiving apparatus through one or more of scheduling information such as the TCI field, DMRS port indicator, MCS, RV, or NDI to indicate the value of N and the correlation between the N data parts to the data receiving apparatus, so that the data transmission between the data sending apparatus and the data receiving apparatus is more flexible, and dynamic switching between repeated transmission and non-repeated transmission can be implemented, thereby improving the flexibility of data transmission.

Embodiment 13

An embodiment provides a storage medium, and one or more computer programs that can be read, compiled and executed by one or more processors can be stored in the storage medium. In the present embodiment, the storage medium can store one of a data sending program or a data receiving program, where the data sending program can be executed by the one or more processors to implement any one of the data sending methods described in the foregoing embodiments, and the data receiving program can be executed by the one or more processors to implement any one of the data receiving methods described in the foregoing embodiments.

Figure 12:
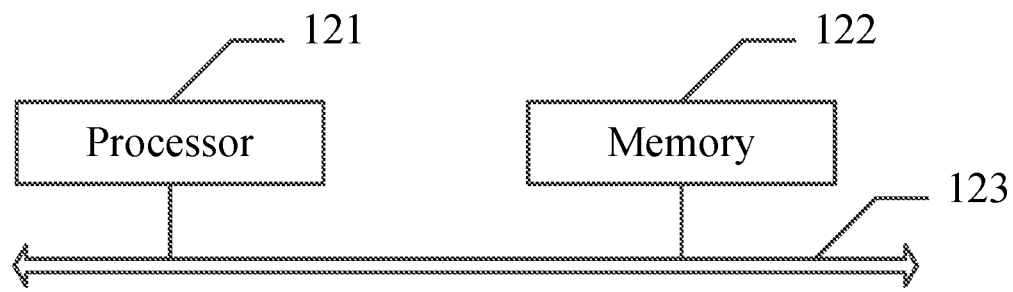
FIG. 12 is a schematic diagram of a hardware structure of a communication device according to an embodiment of the present disclosure.

The present disclosure further provides a communication device. As shown in FIG. 12, the communication device 120 includes a processor 121, a memory 122, and a communication bus 123, where the communication bus 123 is configured to implement communication connection between the processor 121 and the memory 122. The memory 122 may be a storage medium storing at least one of the data sending program or data receiving program described above.

If the data sending program is stored in the memory 122, the processor 121 may read and compile a state indication program, and execute the steps for implementing the data sending method described in the foregoing embodiment. The communication device 120 may be a TRP such as a base station, and the details of the data sending method implemented by the communication device 120 may be referred to the descriptions of the foregoing embodiment, which will not be repeated here.

If the data receiving program is stored in the memory 122, the processor 121 may read and compile the data receiving program, and execute the steps for implementing the data receiving method described in the foregoing embodiment. The communication device 120 may be a terminal, and the details of the data receiving method implemented by the communication device 120 may be referred to the descriptions of the foregoing embodiment, which will not be repeated here.

Figure 13:
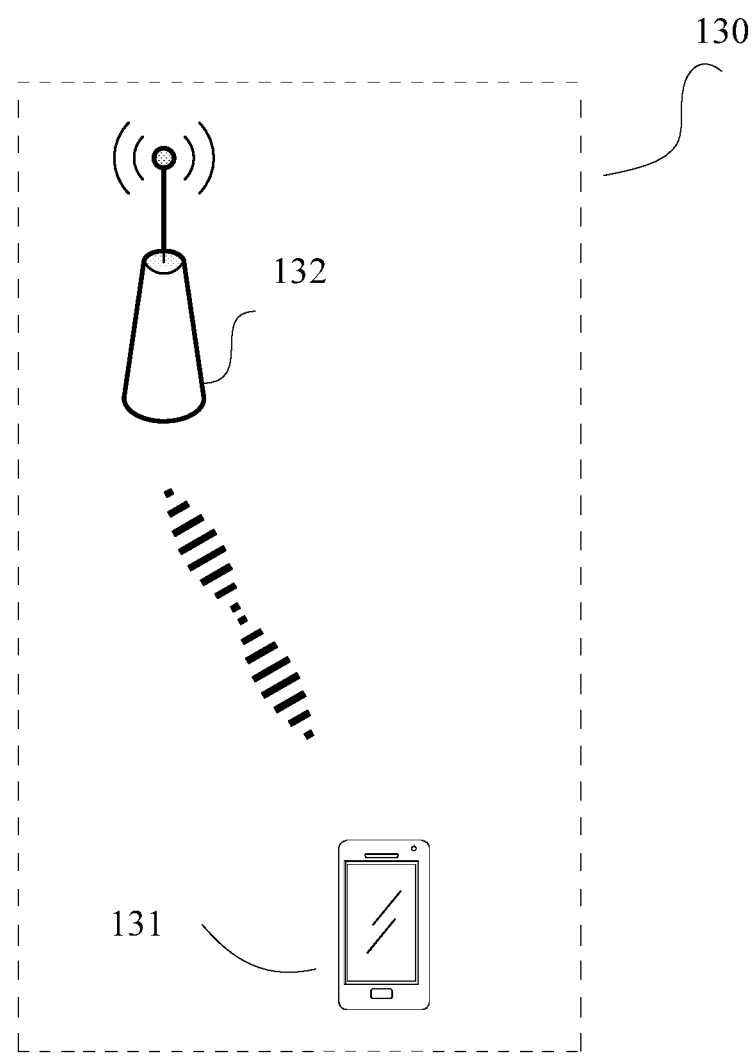
FIG. 13 is a schematic diagram of a communication system according to an embodiment of the present disclosure.

This embodiment further provides a communication system. Referring to FIG. 13, the communication system 130 includes a terminal 131 and at least one TRP 132. In other examples of this embodiment, the communication system 130 may include multiple TRPs, for example, may include a first TRP and a second TRP. The terminal 131 may be a communication device in FIG. 12 which the processor can execute the data receiving program to implement the data receiving method. The TRP 132 may be a communication device in FIG. 12 which the processor can execute the data sending program to implement the data sending method.

According to the communication system provided by the embodiment of the present disclosure, when the TRP transmits downlink data to the terminal, the TB information can be indicated through at least one of the following scheduling information: the TCI field, DMRS port indicator, MCS, RV, or NDI. Therefore, the downlink data transmission between the TRP and the terminal can be switched between the repeated transmission and non-repeated transmission according to requirements, thereby improving the flexibility of data transmission.

Those skilled in the art should understand that the data sending method, data receiving method, apparatus, terminal, TRP, and storage medium provided in the embodiments of the present disclosure can be applied not only to the 5G communication system, but also to any one future communication system.

In the present disclosure, the features of the various embodiments, if not in collision, may be combined with each other.

It should be understood by those skilled in the art that functional modules/units in all or part of the steps of the method, the system and the apparatus disclosed above may be implemented as software (may be implemented by program codes executable by a computing device), firmware, hardware and appropriate combinations thereof. In the hardware implementation, division of the functional modules/units mentioned in the above description may not correspond to division of physical components. For example, one physical component may have several functions, or one function or step may be executed jointly by several physical components. Some or all physical components are implemented as software executed by processors such as central processing units, digital signal processors or microcontrollers, hardware, or integrated circuits such as application specific integrated circuits. Such software may be distributed on a computer-readable medium and executed by a computing device, and in some cases, the steps shown or described may be executed in a different order than here. The computer-readable medium may include a computer storage medium (or a non-transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a RAM, a ROM, an EEPROM, a flash memory or other memory technologies, a CD-ROM, a digital versatile disc (DVD) or other optical disc storage, a magnetic cassette, a magnetic tape, a magnetic disk storage or other magnetic storage apparatuses, or any other medium used for storing desired information and accessed by a computer. The present disclosure is not limited to any specific combination of hardware and software.

The above content is a further detailed description of the present disclosure in conjunction with the specific preferred embodiments, and the specific implementation of the present disclosure is not limited to the description. For those skilled in the art to which the present disclosure pertains, a number of simple deductions or substitutions may be made without departing from the concept of the present disclosure and should fall within the protection scope of the present disclosure.

What is claimed is:

1. A data sending method, comprising:
   transmitting data scheduled by one downlink control information (DCI) to a receiving side, wherein the data comprises N data parts with N≥1; and
   notifying the receiving side of whether the N data parts have the correlation in a case of N>1 by using a demodulation reference signal (DMRS) port indicator;
   wherein a value of N and whether the N data parts have a correlation in a case of N>1 are determined by a transmission configuration indicator (TCI) field, and the DMRS port indicator; and
   wherein each data part of the N data parts corresponds at least to one DMRS port group, one transport block TB, and one physical downlink shared channel PDSCH.

2. The data sending method of claim 1, wherein the correlation is that one data part is repeated with another data part.

3. The data sending method of claim 1, wherein the value of N is equal to R, and R is a number of TCIs corresponding to the TCI field.

4. The data sending method of claim 1, wherein in a case where the DMRS port indicator characterizes that the N data parts have the correlation, the N data parts correspond to N TBs.

5. The data sending method of claim 4, wherein a predefined relationship is satisfied between redundant versions (RVs) of the N TBs.

6. The data sending method of claim 5, a relationship between RVs of a first TB of the N TBs and a second TB of the N TBs is be predefined as:
   when RV of first TB is 0, RV of second TB is 2;
   when RV of first TB is 2, RV of second TB is 3;
   when RV of first TB is 3, RV of second TB is 1; and
   when RV of first TB is 1, RV of second TB is 0.

7. A data receiving method, comprising:
   receiving data sent by a transmitting and receiving point (TRP), wherein the data comprises N data parts with N≥1; and
   determining whether the N data parts have the correlation in a case of N>1 according to a demodulation reference signal (DMRS) port indicator;
   wherein a value of N and whether the N data parts have a correlation in a case of N>1 are determined by a transmission configuration indicator (TCI) field, and the DMRS port indicator; and
   wherein each data part of the N data parts corresponds at least to one DMRS port group, one transport block (TB), and one physical downlink shared channel (PDSCH).

8. The data receiving method of claim 7, wherein the correlation is that one data part is repeated with another data part.

9. The data receiving method of claim 7, wherein the value of N is R, and R is a number of TCIs corresponding to the TCI field.

10. The data receiving method of claim 7, wherein in a case where the DMRS port indicator characterizes that the N data parts have the correlation, the N data parts correspond to N TBs.

11. The data receiving method of claim 10, wherein a predefined relationship is satisfied between redundant versions (RVs) of the N TBs.

12. The data sending method of claim 11, wherein a relationship between RVs of a first TB of the N TBs and a second TB of the N TBs is be predefined as:
   when RV of first TB is 0, RV of second TB is 2;
   when RV of first TB is 2, RV of second TB is 3;
   when RV of first TB is 3, RV of second TB is 1; and
   when RV of first TB is 1, RV of second TB is 0.

13. A communication device, comprising a processor and a memory, wherein the processor is configured to execute a data sending program stored in the memory to implement the steps of:
   transmitting data scheduled by one downlink control information (DCI), to a receiving side, wherein the data comprises N data parts with N≥1; and
   notifying the receiving side of whether the N data parts have the correlation in a case of N>1 by using a demodulation reference signal (DMRS) port indicator;
   wherein a value of N and whether the N data parts have a correlation in a case of N>1 are determined by a transmission configuration indicator (TCI), field, and the DMRS port indicator; and
   wherein each data part of the N data parts corresponds at least to one DMRS port group, one transport block (TB), and one physical downlink shared channel (PDSCH).

14. The communication device of claim 13, wherein the correlation is that one data part is repeated with another data part.

15. The communication device of claim 13, wherein the value of N is equal to R, and R is a number of TCIs corresponding to the TCI field.

16. The communication device of claim 13, wherein in a case where the DMRS port indicator characterizes that the N data parts have the correlation, the N data parts correspond to N TBs.

17. The communication device of claim 16, wherein a predefined relationship is satisfied between redundancy versions (RVs) of the N TBs.

18. The communication device of claim 17, wherein a relationship between RVs of a first TB of the N TBs and a second TB of the N TBs is be predefined as:
   when RV of first TB is 0, RV of second TB is 2;
   when RV of first TB is 2, RV of second TB is 3;
   when RV of first TB is 3, RV of second TB is 1; and
   when RV of first TB is 1, RV of second TB is 0.

19. A communication device, comprising a processor and a memory, wherein the processor is configured to execute a data receiving program stored in the memory to implement the steps of:
   receiving data sent by a transmitting and receiving point (TRP), wherein the data comprises N data parts with N≥1; and determining whether the N data parts have the correlation in a case of N>1 according to a demodulation reference signal (DMRS) port indicator;

wherein a value of N and whether the N data parts have a correlation in a case of N>1 are determined by a transmission configuration indicator (TCI), field, and the DMRS port indicator; and wherein each data part of the N data parts corresponds at least to one DMRS port group, one transport block (TB), and one physical downlink shared channel (PDSCH).

20. The communication device of claim 19, wherein the correlation is that one data part is repeated with another data part.

21. The communication device of claim 19, wherein the value of N is R, and R is a number of TCIs corresponding to the TCI field.

22. The communication device of claim 19, wherein in a case where the DMRS port indicator characterizes that the N data parts have the correlation, the N data parts correspond to N TBs.

23. The communication device of claim 22, wherein a predefined relationship is satisfied between redundancy versions RVs of the N TBs.

24. The communication device of claim 23, wherein a relationship between RVs of a first TB of the N TBs and a second TB of the N TBs is be predefined as:

when RV of first TB is 0, RV of second TB is 2;
when RV of first TB is 2, RV of second TB is 3;
when RV of first TB is 3, RV of second TB is 1; and
when RV of first TB is 1, RV of second TB is 0.

* * * * *

UNITED STATES PATENT AND TRADEMARK OFFICE
CERTIFICATE OF CORRECTION

PATENT NO. : 11,224,065 B2
APPLICATION NO. : 17/214287
DATED : January 11, 2022
INVENTOR(S) : Chuangxin Jiang et al.

It is certified that error appears in the above-identified patent and that said Letters Patent is hereby corrected as shown below:

In the Claims

Please amend Claim 1 as shown:
1. A data sending method, comprising:
    transmitting data scheduled by one downlink control information (DCI) to a receiving side, wherein the data comprises N data parts with $N \geq 1$; and
    notifying the receiving side of whether the N data parts have a correlation in a case of $N > 1$ by using a demodulation reference signal (DMRS) port indicator;
    wherein a value of N and whether the N data parts have the correlation in the case of $N > 1$ are determined by a transmission configuration indicator (TCI) field, and the DMRS port indicator; and
    wherein each data part of the N data parts corresponds at least to one DMRS port group, one transport block (TB), and one physical downlink shared channel (PDSCH).

Please amend Claim 5 as shown:
5. The data sending method of claim 4, wherein a predefined relationship is satisfied between redundancy versions (RVs) of the N TBs.

Please amend Claim 7 as shown:
7. A data receiving method, comprising:
    receiving data sent by a transmitting and receiving point (TRP), wherein the data comprises N data parts with $N \geq 1$; and
    determining whether the N data parts have a correlation in a case of $N > 1$ according to a demodulation reference signal (DMRS) port indicator;
    wherein a value of N and whether the N data parts have the correlation in the case of $N > 1$ are determined by a transmission configuration indicator (TCI) field, and the DMRS port indicator; and
    wherein each data part of the N data parts corresponds at least to one DMRS port group, one transport block (TB), and one physical downlink shared channel (PDSCH).

Please amend Claim 11 as shown:

Signed and Sealed this
Twenty-eighth Day of March, 2023

*Katherine Kelly Vidal*

Katherine Kelly Vidal
*Director of the United States Patent and Trademark Office*

CERTIFICATE OF CORRECTION (continued)
U.S. Pat. No. 11,224,065 B2

11. The data receiving method of claim 10, wherein a predefined relationship is satisfied between redundancy versions (RVs) of the N TBs.

Please amend Claim 12 as shown:
12. The data receiving method of claim 11, wherein a relationship between RVs of a first TB of the N TBs and a second TB of the N TBs is be predefined as:
    when RV of first TB is 0, RV of second TB is 2;
    when RV of first TB is 2, RV of second TB is 3;
    when RV of first TB is 3, RV of second TB is 1; and
    when RV of first TB is 1, RV of second TB is 0.

Please amend Claim 13 as shown:
13. A communication device, comprising a processor and a memory, wherein the processor is configured to execute a data sending program stored in the memory to implement the steps of:
    transmitting data scheduled by one downlink control information (DCI), to a receiving side, wherein the data comprises N data parts with $N \geq 1$; and
    notifying the receiving side of whether the N data parts have a correlation in a case of $N > 1$ by using a demodulation reference signal (DMRS) port indicator;
    wherein a value of N and whether the N data parts have the correlation in the case of $N > 1$ are determined by a transmission configuration indicator (TCI), field, and the DMRS port indicator; and
    wherein each data part of the N data parts corresponds at least to one DMRS port group, one transport block (TB), and one physical downlink shared channel (PDSCH).

Please amend Claim 19 as shown:
19. A communication device, comprising a processor and a memory, wherein the processor is configured to execute a data receiving program stored in the memory to implement the steps of:
    receiving data sent by a transmitting and receiving point (TRP), wherein the data comprises N data parts with $N \geq 1$; and
    determining whether the N data parts have a correlation in a case of $N > 1$ according to a demodulation reference signal (DMRS) port indicator;
    wherein a value of N and whether the N data parts have the correlation in the case of $N > 1$ are determined by a transmission configuration indicator (TCI), field, and the DMRS port indicator; and
    wherein each data part of the N data parts corresponds at least to one DMRS port group, one transport block (TB), and one physical downlink shared channel (PDSCH).